United States Patent
Wolff et al.

(10) Patent No.: US 10,287,011 B2
(45) Date of Patent: May 14, 2019

(54) AIR VEHICLE

(75) Inventors: Amit Wolff, Zur Moshe (IL); Guy Dekel, Kazir (IL); Lior Zivan, Hadera (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 339 days.

(21) Appl. No.: 13/322,496

(22) PCT Filed: May 26, 2010

(86) PCT No.: PCT/IL2010/000416
§ 371 (c)(1),
(2), (4) Date: Nov. 25, 2011

(87) PCT Pub. No.: WO2010/137016
PCT Pub. Date: Dec. 2, 2010

(65) Prior Publication Data
US 2012/0091257 A1  Apr. 19, 2012

(30) Foreign Application Priority Data
May 27, 2009 (IL) .......................................... 199009

(51) Int. Cl.
*B64C 27/22* (2006.01)
*B64C 29/00* (2006.01)
*B64C 39/02* (2006.01)

(52) U.S. Cl.
CPC .......... *B64C 29/0033* (2013.01); *B64C 27/22* (2013.01); *B64C 39/024* (2013.01);
(Continued)

(58) Field of Classification Search
CPC ............ B64C 39/024; B64C 2201/027; B64C 29/0033; B64C 2201/088;
(Continued)

(56) References Cited

U.S. PATENT DOCUMENTS

| 1,783,458 A | 12/1930 | Windsor |
| 1,867,963 A * | 7/1932 | Blahnik .............. B64C 29/0033 244/7 C |

(Continued)

FOREIGN PATENT DOCUMENTS

| FR | 2 830 839 A1 | 4/2003 |
| KR | 2003-0049796 A | 6/2003 |

(Continued)

OTHER PUBLICATIONS

Article from Internet, "Wikipedia," search term "EWR VJ-101 Aircraft," Sep. 19, 2007, http://web.archive.org/web/20070926232601/http://en.wikipedia.org/wiki/EWR_VJ_101.

(Continued)

*Primary Examiner* — Richard R. Green
(74) *Attorney, Agent, or Firm* — Oliff PLC

(57) ABSTRACT

In embodiments, a system and method for providing propulsion and control to an air vehicle, and for operating the vehicle, include at least three propulsion units that provide vertical thrust for vectored thrust flight, in which at least one or two of the propulsion units also provide thrust for vectored thrust cruising or aerodynamic flight by suitably tilting the respective propulsion units for changing the thrust vector. At the same time, the three or more propulsion units are operated to generate controlling moments to the air vehicle about three orthogonal axes, pitch, roll and yaw, during vectored thrust flight (hover, cruising, etc.) or during aerodynamic flight for controlling the vehicle.

19 Claims, 9 Drawing Sheets

(52) U.S. Cl.
CPC .. *B64C 2201/021* (2013.01); *B64C 2201/042* (2013.01); *B64C 2201/088* (2013.01); *B64C 2201/126* (2013.01); *B64C 2201/165* (2013.01); *B64C 2211/00* (2013.01)

(58) Field of Classification Search
CPC ... B64C 2201/042; B64C 27/08; B64C 27/28; B64C 15/12; B64C 2201/127; B64C 29/0075; B64C 2001/0045; B64C 2201/048; B64C 2201/126; B64C 2201/165; B64C 27/52; B64C 29/0083; B64C 39/00; B64C 15/00; B64C 17/06; B64C 1/0009; B64C 2201/00; B64C 2201/146; B64C 27/12; B64C 27/26; B64C 29/00; B64C 29/02; B64C 39/028; B64C 39/08; B64C 15/02; B64C 15/14; B64C 19/00; B64C 1/26; B64C 2001/0027; B64C 2001/0072; B64C 2027/8236; B64C 2027/8281; B64C 2201/122; B64C 2201/128; B64C 2201/14; B64C 25/001; B64C 27/10; B64C 27/82; B64C 29/0008; B64C 37/00; B64C 39/02; B64C 27/22; B64C 23/005
USPC ....... 244/12.3, 12.4, 55, 56, 66, 23 A, 23 B; D12/328, 339
See application file for complete search history.

(56) References Cited

U.S. PATENT DOCUMENTS

| | | | | |
|---|---|---|---|---|
| 2,478,847 | A * | 8/1949 | Stuart, IIII | B64C 29/0033 244/233 |
| 2,825,514 | A | 3/1958 | Focke | |
| 2,936,967 | A * | 5/1960 | Dancik | B64C 29/0033 244/7 C |
| 2,936,968 | A * | 5/1960 | Mazzitelli | B64C 29/0033 244/7 C |
| 2,944,395 | A * | 7/1960 | Doak | B64C 29/0075 239/265.29 |
| 2,969,935 | A * | 1/1961 | Price | 244/7 C |
| 3,038,683 | A | 6/1962 | Rowe | |
| 3,181,810 | A * | 5/1965 | Olson | 244/7 R |
| 3,572,612 | A * | 3/1971 | Irbitis | B64C 29/0033 244/7 C |
| 4,828,203 | A * | 5/1989 | Clifton | B64C 29/0025 244/12.3 |
| 4,856,732 | A * | 8/1989 | Eickmann | 244/2 |
| 4,880,071 | A * | 11/1989 | Tracy | 180/117 |
| 5,419,514 | A * | 5/1995 | Ducan | 244/12.4 |
| 5,823,468 | A * | 10/1998 | Bothe | 244/2 |
| 5,941,478 | A | 8/1999 | Schmittle | |
| 6,286,783 | B1 * | 9/2001 | Kuenkler | 244/30 |
| D454,109 | S | 3/2002 | Moshier | |
| 6,464,166 | B1 | 10/2002 | Yoeli | |
| 6,488,232 | B2 | 12/2002 | Moshier | |
| 6,655,631 | B2 * | 12/2003 | Austen-Brown | 244/12.4 |
| 6,848,649 | B2 * | 2/2005 | Churchman | B64C 29/0025 244/12.6 |
| 6,892,979 | B2 | 5/2005 | Milde, Jr. | |
| 7,267,300 | B2 | 9/2007 | Heath et al. | |
| 7,461,811 | B2 | 12/2008 | Milde, Jr. | |
| 7,472,863 | B2 | 1/2009 | Pak | |
| 2002/0113165 | A1 | 8/2002 | Moshier | |
| 2003/0062442 | A1 | 4/2003 | Milde, Jr. | |
| 2003/0080242 | A1 | 5/2003 | Kawai | |
| 2003/0085319 | A1 * | 5/2003 | Wagner et al. | 244/12.3 |
| 2003/0094537 | A1 | 5/2003 | Austen-Brown | |
| 2004/0026563 | A1 * | 2/2004 | Moller | 244/12.4 |
| 2004/0029550 | A1 | 2/2004 | Kishi | |
| 2004/0094662 | A1 | 5/2004 | Sanders, Jr. et al. | |
| 2005/0029400 | A1 * | 2/2005 | Ouellette | B64C 1/00 244/120 |
| 2005/0133662 | A1 | 6/2005 | Magre | |
| 2006/0226281 | A1 | 10/2006 | Walton | |
| 2007/0018035 | A1 * | 1/2007 | Saiz et al. | 244/12.3 |
| 2007/0023573 | A1 | 2/2007 | Neale et al. | |
| 2007/0057113 | A1 | 3/2007 | Parks | |
| 2008/0054121 | A1 | 3/2008 | Yoeli | |
| 2008/0149758 | A1 | 6/2008 | Colgren et al. | |
| 2009/0256026 | A1 * | 10/2009 | Karem | B64C 27/08 244/99.2 |

FOREIGN PATENT DOCUMENTS

| | | |
|---|---|---|
| KR | 100957426 B1 | 5/2010 |
| WO | WO 2008/054234 A1 | 5/2008 |

OTHER PUBLICATIONS

Article from Internet, "Wikipedia," search term "Curtiss-Wright X-19," Jan. 17, 2009, http://web.archive.org/web/20090226220739/http://en.wikipedia.org/wiki/Curtiss-Wright_X-19.

Article from Internet, "aviastar.org," "Curtixx X-19 Helicopter—Development, History, Photos, Technical Data," Jan. 8, 2009, http://web.archive.org/web/20090108144049/http://www.aviastar.org/helicopters_eng/curtiss_x-19.php.

Article from Internet, "Wikipedia," search term "Canadair CL-87," Jan. 9, 2008, http://web.archive.org/web/20080110205048/http://en.wikipedia.org/wiki/Canadair_CL-84.

Article from Internet, "Wikipedia," search term "Bell X-22," Jan. 30, 2009, http://web.archive.org/web/20090408183926/http://en.wikipedia.org/wiki/Bell_X-22.

Article, from Internet, "airandspace.si.edu," title "Curtiss-Wright X-100," Sep. 1, 2006, http://web.archive.org/web/20060901064008/http://www.nasm.si.edu/researeh/aero/aircraft/curtiss_x100.htm.

Article from Internet, "Wikipedia," search term "LTV XC-142," Feb. 7, 2009, http://web.archive.org/web/20090522171451/http://en.wikipedia.org/wiki/LTV_XC-142.

Hirschel, E.H. et al., *Aeronautical Research in Germany—from Lilienthal until Today*, ISBN 3-540-40645-x, Springer-Verlag Berlin Heidelberg New York, 2004, p. 514.

Collection of Illustrations (to the articles listed above) Figs. 1-7.

Thesis, William J. Nieusma, An Investigation of Two-Propeller Tilt Wing V/STOL Aircraft Flight Characteristics, Naval Postgraduate School, Monterey, California, Jun. 1993, pp. 1-11.

U.S. Pat. No. 1783458, Dec. 2, 1930, G. W. Windsor, Vertical Lift Airplane(error reported during submittal using "U.S. Patents" section of the form, so it is included here as a "Non-Patent Publication").†

\* cited by examiner
† cited by third party

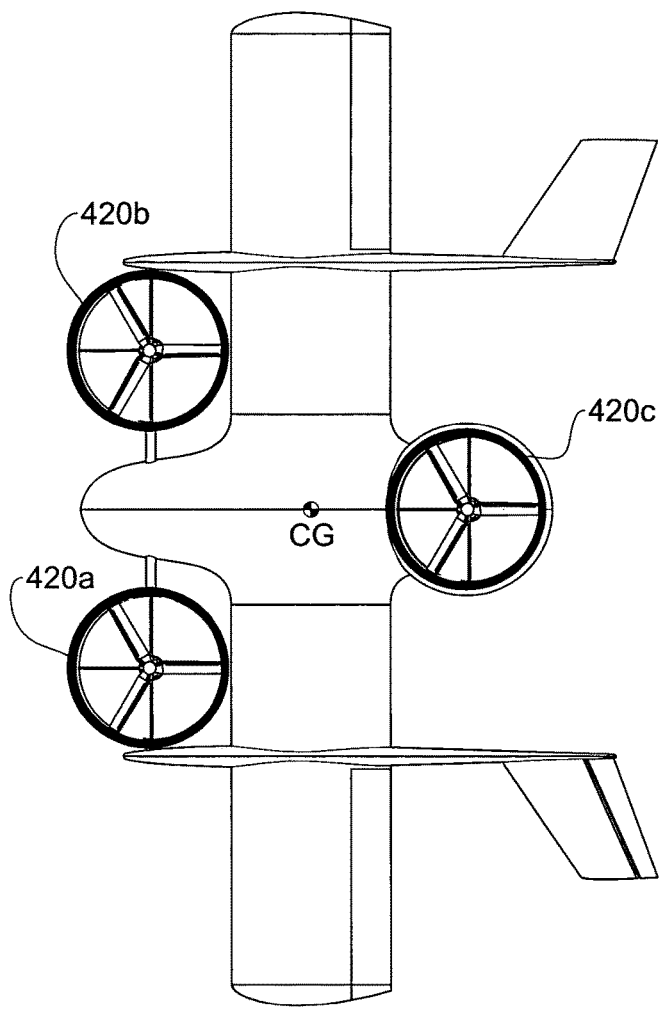
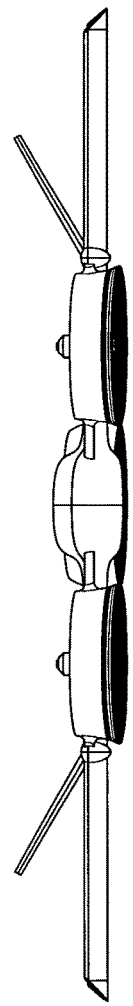
FIG. 7(a)  FIG. 7(b)
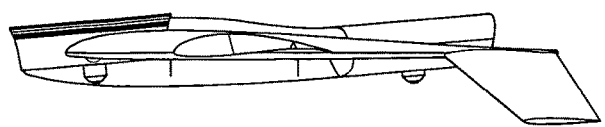
FIG. 7(c)

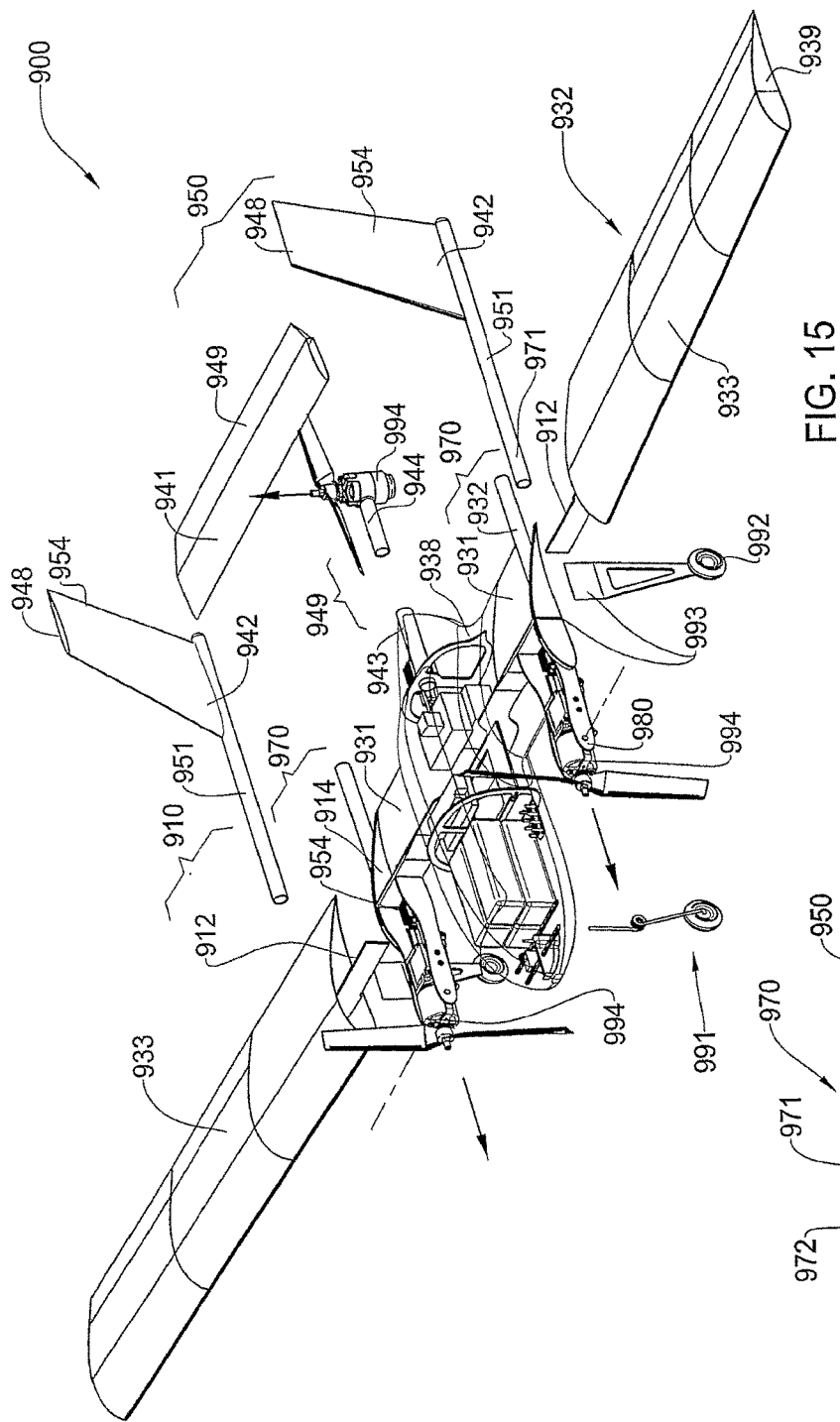
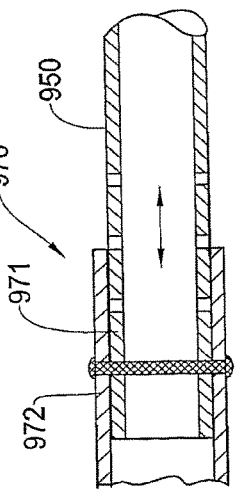
FIG. 15
FIG. 15(a)

AIR VEHICLE

CROSS-REFERENCE TO RELATED APPLICATIONS

This application is a national stage application of International Application No. PCT/IL2010/000416 filed May 26, 2010, which claims the benefit of Application No. IL 199009 filed May 27, 2009. The disclosures of the prior applications are hereby incorporated by reference herein in their entirety.

FIELD OF THE INVENTION

This invention relates to air vehicles, in particular to vertical take off and landing (VTOL) air vehicles, short take off and landing (STOL) air vehicles, and vertical/short take off and landing (V/STOL) air vehicles.

BACKGROUND OF THE INVENTION

There are at least four main categories of VTOL or V/STOL vehicles: where the vehicle has a single powerplant adapted for producing vertical as well as horizontal thrust; where the vehicle has separate powerplants for producing vertical and horizontal thrust; where the vehicle has a powerplant for vertical and horizontal thrust, plus a supplemental powerplant for vertical thrust; other configurations.

By way of general background, the following publications disclose various aircraft configurations.

U.S. Pat. No. 7,267,300 discloses an aircraft comprising an airframe, a power plant mounted on the airframe, and at least two propellers rotatably mounted on the airframe and powered by the power plant for moving the aircraft in a generally forward direction during operation of the propellers. Also, the aircraft includes at least two counter-rotatable fan sets mounted on the airframe and powered by the power plant for providing upward lift to the aircraft during operation of the fan sets.

US 2006/0226281 discloses a vertical take-off and landing vehicle comprised of a fuselage having a front, a rear, and two lateral sides and a set of four thrusters set to the front, the left, the right, and the rear of said fuselage. The thrusters are comprised of a set of two counter rotating propellers both of which creates lift. The two counter rotating propellers cancel out the torque effect normally created by using only one propeller. The ducted fan units are movable between a first position in which they provide vertical lift and a second position in which they provide horizontal thrust using a set of servos and gears.

U.S. Pat. No. 7,472,863 discloses a vertical takeoff and landing (VTOL) aircraft design comprising one internal combustion engine able to spit shaft power to four fan units. The fan units further employ counter rotating fan blades for stability. Separate horizontal and vertical tilting mechanisms delivered to the fan units are additionally disclosed. A variation in design is further included wherein electric motors provide the necessary shaft power.

US 2004/094662 discloses an Unusual Flying Object said to have VTOL capabilities including forward flight with a Linear Induction Magnetic Bearings power drive.

U.S. Pat. No. 7,461,811 discloses a STOL or VTOL winged aircraft comprising a fuselage and a fixed wing attached to the fuselage and extending outward from the two lateral sides thereof, forming one wing component extending outward from one side of the fuselage and a second wing component extending outward from the opposite side of the fuselage. At least one "thruster" is disposed in each wing component to provide vertical lift to the aircraft when the aircraft is stationary or moving forward only slowly. The thruster includes a shaft mounted for rotation in the respective wing component and extending substantially parallel to the wing axis and a plurality of fan blades attached to the shaft for movement of air.

US 2003/062442 discloses a personal aircraft said to be capable of vertical take-off and landing and comprises a passenger compartment having a front, a rear and two sides, and a plurality of independently powered thrusters attached to the outer periphery of the compartment. At least three thrusters are disposed on each side of the compartment. The thrusters, which are preferably ducted fan units, are capable of providing a vertically upward force to the compartment.

U.S. Pat. No. 6,892,979 discloses a personal aircraft said to be capable of vertical take-off and landing which comprises: (a) a fuselage having a front end, a rear end and two lateral sides, the fuselage having a central longitudinal axis extending from the front end to the rear end, between the two lateral sides; (b) at least one, and preferably two or more, ducted fans, each arranged in the fuselage between the front end and the rear end and between the two lateral sides, for providing vertical lift; and (c) at least one substantially horizontal wing attached to each side of the fuselage and extending outward with respect to the central longitudinal axis.

U.S. Pat. No. 6,464,166 discloses a vehicle, particularly a VTOL air vehicle, including a duct carried by the vehicle frame with the longitudinal axis of the duct perpendicular to the longitudinal axis of the vehicle frame; a propeller rotatably mounted within the duct about the longitudinal axis of the duct to force an ambient fluid, e.g. air, therethrough from its inlet at the upper end of the duct through its exit at the lower end of the duct, and thereby to produce an upward lift force applied to the vehicle; and a plurality of parallel, spaced vanes pivotally mounted to and across the inlet end of the duct about pivotal axes perpendicular to the longitudinal axis of the duct and substantially parallel to the longitudinal axis of the vehicle frame. The vanes are selectively pivotal to produce a desired horizontal force component to the lift force applied to the vehicle. Various vane arrangements are disclosed for producing side, roll, pitch and yaw movements of the vehicle.

US 2003/080242 discloses an aircraft that is mounted with turbofan engines with separate core engines having fan engines used commonly for cruising and lifting up, through enabling to direct the thrust from fan engines to all directions by supporting the fan engines composing the turbofan engines with separate core engines in biaxial support so that the fan engines are rotatable in the direction of pitching and rolling, the fan engines are mounted on both sides of each of front and rear wings.

US 2007/0057113 discloses a system and method are provided for a STOL/VTOL aircraft that stores required take-off power in the form of primarily an electric fan engine, and secondarily in the form of an internal combustion engine.

US 2008/0054121 discloses a VTOL vehicle comprising a fuselage having forward and aft propulsion units, each propulsion unit comprising a propeller located within an open-ended duct wall wherein a forward facing portion of the duct wall of at least the forward propulsion unit is comprised of at least one curved forward barrier mounted for horizontal sliding movement to open the forward facing portion to thereby permit air to flow into the forward facing portion when the VTOL vehicle is in forward flight.

US 2002/113165 discloses a vertical takeoff aircraft that uses ducted fans for lift and propulsion. The fans are attached to an airframe and are disposed on opposite lateral sides of the aircraft. The thrust from the each of the fans may be deflected in different directions by using vanes with flaps disposed within the ducts of the fans, as well as by tilting the entire fan assemblies.

U.S. Pat. No. 6,488,232 discloses a single passenger aircraft configured to vertically take-off and land. An airframe is configured to support the passenger in an upright position during take-off and landing and during flight. The aircraft includes a pair of propulsion devices that are mounted on an airframe above the level of the pilot. A set of hand operated control devices are mechanically linked to the propulsion devices for varying the orientation of the propulsion devices during flight.

SUMMARY OF THE INVENTION

According to a first aspect of the invention there is provided a system and method for providing propulsion and control to an air vehicle, and for operating the vehicle, in which at least three propulsion units provide vertical thrust for vectored thrust flight, and wherein at least one or two of the propulsion units also provide thrust for vectored thrust cruising or aerodynamic flight by suitably tilting the propulsion units for changing the thrust vector thereof. At the same time, the at least three propulsion units are operated to generate controlling moments to the air vehicle about three orthogonal axes, pitch, roll and yaw, during vectored thrust flight (hover, cruising, etc.) or during aerodynamic flight for controlling the vehicle (though for cruising vectored thrust flight and aerodynamic flight only two of the at least three propulsion units can be operated to generate the aforesaid controlling moments to the air vehicle about the three orthogonal axes, pitch, roll and yaw). The control moments are generated by selectively varying the thrust generated by each of the propulsion units independently of one another, and: by selectively vectoring the thrust of one propulsion unit with respect to each of two independent tilt axes independently of one another, or by selectively vectoring the thrust of each of two propulsion units with respect to a respective tilt axis, independently of one another.

Although more than three propulsion units may be provided and/or each propulsion unit may be configured for being tilted about one or two independent axes, the first aspect of the invention also provides for at least some embodiments of the propulsion system to be configured in a relatively simple manner, comprising three propulsion units, in which two thrust vectors are independently and selectively variable via tilting of one or two of the propulsion units, and the three thrusts are independently controllable, to provide control moments in three degrees of freedom, plus thrust for hover and cruise.

According to a first embodiment, there is provided a propulsion and control system for an air vehicle comprising at least three propulsion units:
wherein at least a first and a second said propulsion units are tiltable propulsion units, each said tiltable propulsion unit being configured for generating a respective thrust and for being selectively tiltable about at least one respective tilt axis to provide a respective thrust vector that is selectively variable at least between a general vertical thrust vector direction and a general longitudinal thrust vector direction with respect to the air vehicle; and wherein at least a third said propulsion unit is configured for generating a respective thrust having a thrust vector alignable in at least said general vertical thrust vector direction;

wherein said system is configured for selectively enabling said propulsion units to provide sufficient thrust to the air vehicle for vectored thrust flight when said respective thrust vectors are aligned with said generally vertical thrust vector direction, and for selectively enabling said propulsion units to provide sufficient thrust to the air vehicle for aerodynamic flight when said respective variable thrust vectors are aligned with said generally longitudinal thrust vector direction, and wherein said system is further configured for selectively generating variable control moments for control and stability of the air vehicle including:

(a) controllably varying said respective thrust generated by each said propulsion unit independently of one another; and (b) controllably varying said respective variable thrust vector provided by each said tiltable propulsion unit independently of one another.

Each said tiltable propulsion unit may comprise, for example, any one of a tiltable ducted fan unit, a tiltable propeller unit, a tiltable turbojet unit, a tiltable turbofan unit, a tiltable propfan unit, and so on. Each such tiltable ducted fan unit may comprise at least one fan, and additionally or alternatively has an absence of vanes for controlling the respective said variable thrust vector. Each said tiltable propulsion unit provides a desired thrust vector by tilting of the respective tiltable propulsion unit about a corresponding tilt axis.

The third propulsion unit may be a non-tiltable propulsion unit, fixedly (i.e., non-tiltably) mountable to the air vehicle to provide a thrust having a fixed thrust vector with respect thereto. Such a non-tiltable propulsion unit may comprise any one of non-tiltable ducted fan unit, a non-tiltable propeller unit, a non-tiltable turbojet unit, a non-tiltable turbofan unit, a non-tiltable propfan unit. For example, such a non-tiltable ducted fan unit may comprise at least one fan and additionally or alternatively may have an absence of movable vanes for controlling the respective said vector. Alternatively, the third propulsion unit may also be a tiltable propulsion unit, tiltable about at least one respective tilt axis. Such a third propulsion unit may be configured for providing a respective variable thrust vector that is selectively variable at least between said general vertical thrust vector direction and said general longitudinal thrust vector direction, and may thus contribute to the thrust of the air vehicle for aerodynamic flight.

Additionally or alternatively, the system may be configured to provide said variable control moment in the form of a pitch control moment in said vectored thrust flight by varying a ratio of said respective thrusts generated by said tiltable propulsion units with respect to said respective thrust generated by said third propulsion unit, to thereby generate a couple with respect to the pitch axis.

Additionally or alternatively, the system may be configured to provide said variable control moment in the form of a yaw control moment in said vectored thrust flight by suitably varying said respective thrust vectors of said tiltable propulsion units (responsive to tilting said tiltable propulsion units) in mutually opposite directions with respect to the respective said tilt axes.

Additionally or alternatively, the system may be configured to provide said variable control moment in the form of a roll control moment in said vectored thrust flight by varying a ratio of said respective thrust generated by said first propulsion unit with respect to said respective thrust generated by said second propulsion unit, to thereby generate a couple with respect to the roll axis.

Additionally or alternatively, the system may additionally be further configured to provide a generally longitudinal (forward or aft) motion when in said vectored thrust flight by suitably varying said respective thrust vectors of said tiltable propulsion units (responsive to tilting said tiltable propulsion units) in mutually similar directions.

Additionally or alternatively, the system may be configured to provide said variable control moment in the form of a yaw control moment in said aerodynamic flight by varying a ratio of the thrust generated by said first propulsion unit with respect to the thrust generated by said second propulsion unit, to thereby generate a couple with respect to the yaw axis.

Additionally or alternatively, the system may be configured to provide said variable control moment in the form of a roll control moment in said aerodynamic flight by suitably by suitably varying said respective thrust vectors of said tiltable propulsion units (responsive to tilting said tiltable propulsion units) in mutually opposite directions with respect to the respective said tilt axes.

Additionally or alternatively, the system may be configured to provide said variable control moment in the form of a pitch control moment in said aerodynamic flight by suitably varying said respective thrust vectors of said tiltable propulsion units (responsive to tilting said tiltable propulsion units) in mutually similar directions.

In at least this embodiment, each said tiltable propulsion unit may comprise a respective motor that is tiltable with the rest of the respective propulsion unit, i.e., the motor is incorporated in the tiltable propulsion unit.

Each said tiltable propulsion unit may be configured for inducing a braking procedure for the respective motor while the respective tiltable propulsion unit is being tilted through a desired tilt angle to vary the respective thrust vector thereof.

In at least this embodiment, at least one said tiltable propulsion unit is a said tiltable ducted fan unit, wherein said respective motor is accommodated in said respective tiltable ducted fan unit and configured for driving the respective said fan. In at least one embodiment, at least one said tiltable propulsion unit is a said tiltable propeller unit, wherein said respective motor is configured for driving a respective propeller thereof.

In at least some embodiments, said propulsion units are configured as mutually co-rotating propulsion units, i.e., the motors and/or the thrust producing vanes/propellers/propfans etc. are rotating in the same direction.

According to the first aspect of the invention there is also provided a method for providing propulsion and control to an air vehicle, comprising, (A) providing the air vehicle with at least three propulsion units, each propulsion unit being configured for providing a selectively adjustable thrust and having a thrust vector at least alignable in a general vertical thrust vector direction, and wherein at least two said propulsion units are each tiltable propulsion units and further configured for enabling said respective thrust vector to be selectively variable at least between said general vertical thrust vector direction and a general longitudinal thrust vector direction with respect to the air vehicle; and (B) selectively operating said propulsion units to provide sufficient thrust to the air vehicle for:

(i) vectored thrust flight, wherein said respective thrust vectors of said at least three propulsion units are aligned with said generally vertical thrust vector direction; and (ii) aerodynamic flight, wherein said respective variable thrust vectors of said tiltable propulsion units are aligned with said generally longitudinal thrust vector direction;

(C) selectively generating variable control moments for control and stability of the air vehicle including:

(a) controllably varying said respective thrust generated by each one of said at least three said propulsion units independently of one another;

(b) controllably varying said respective variable thrust vector provided by each said tiltable propulsion unit independently of one another.

According to a second embodiment, there is provided a propulsion and control system for an air vehicle comprising at least three propulsion units:

wherein at least one said propulsion units is a tiltable propulsion unit, configured for generating a respective thrust and for being selectively tiltable about each one of at least two respective tilt axes to provide a first thrust vector that is selectively variable with respect to one said tilt axis at least between a general vertical thrust vector direction and a general longitudinal thrust vector direction, and to provide a second thrust vector that is selectively variable with respect to another said tilt axis; and wherein at least two other said propulsion unit are each configured for generating a respective thrust having a respective thrust vector alignable in at least said general vertical thrust vector direction;

wherein said system is configured for selectively enabling said propulsion units to provide sufficient thrust to the air vehicle for vectored thrust flight when said respective thrust vectors are aligned with said generally vertical thrust vector direction, and for selectively enabling said at least one tiltable propulsion unit to provide sufficient thrust to the air vehicle for aerodynamic flight when said first thrust vector is aligned with said generally longitudinal thrust vector direction, and wherein said system is further configured for selectively generating variable control moments for control and stability of the air vehicle including:

(a) controllably and separately varying said respective thrust generated by each said propulsion unit independently of one another; and (b) controllably and separately varying said first thrust vector provided by said tiltable propulsion unit independently of said second thrust vector.

The tiltable propulsion unit may be pivotably mounted to a one support ring or similar structure about the second tilt axis for enabling tilting about the second tilt axis, and the first support ring may in turn be pivotably mounted to a support structure (e.g., the air vehicle) about the first pivot axis, for enabling tilting about the first tilt axis. Thus, tilting about the first axis is independent of tilting about the second axis.

The first tilt axis may be generally orthogonal to the second tilt axis.

The tiltable propulsion unit may comprise, for example, any one of a tiltable ducted fan unit, a tiltable propeller unit, a tiltable turbojet unit, a tiltable turbofan unit, a tiltable propfan unit. Such said tiltable ducted fan unit may comprise at least one fan, and additionally or alternatively has an absence of vanes for controlling the respective said variable thrust vector. The said tiltable propulsion unit provides a desired first thrust vector and/or a desired second thrust vector by tilting of the respective tiltable propulsion unit about the corresponding (first) tilt axis and/or the other corresponding (second) tilt axis, respectively.

The said two other propulsion units may be non-tiltable propulsion units, fixedly (i.e., non-tiltably) mountable to the air vehicle to each provide a thrust having a fixed thrust vector with respect thereto. Such non-tiltable propulsion units may each comprise any one of non-tiltable ducted fan unit, a non-tiltable propeller unit, a non-tiltable turbojet unit, a non-tiltable turbofan unit, a non-tiltable propfan unit. For example, each non-tiltable ducted fan unit may comprise at least one fan and additionally or alternatively may have an absence of vanes for controlling the respective said vector.

Alternatively, the said two other propulsion units may also each be a tiltable propulsion unit, tiltable about at least one respective tilt axis, and may optionally also be configured for providing a respective variable thrust vector that is selectively variable at least between said general vertical thrust vector direction and said general longitudinal thrust vector direction—thus also contributing to the total thrust for aerodynamic flight as well as for vectored thrust flight.

The system according to this embodiment may be configured to provide said variable control moment in the form of a pitch control moment in said vectored thrust flight by varying a ratio of said respective thrust generated by said tiltable propulsion unit with respect to said respective thrusts generated by said two other propulsion units to provide a couple about the pitch axis.

Additionally or alternatively, the system according to this embodiment may be configured to provide said variable control moment in the form of a yaw control moment in said vectored thrust flight by suitably varying said second thrust vector of said tiltable propulsion units with respect to second said tilt axis, i.e., by tilting the tilting propulsion unit about the second said tilt axis, which is aligned with the pitch axis.

Additionally or alternatively, the system according to this embodiment may be configured to provide said variable control moment in the form of a roll control moment in said vectored thrust flight by varying a ratio of said respective thrust generated by each of the said two other propulsion units to generate a couple about the roll axis.

Additionally or alternatively, the system according to this embodiment may additionally be further configured to provide a generally longitudinal (forward or aft) motion when in said vectored thrust flight by suitably varying said first thrust vector of said tiltable propulsion unit by tilting about the first tilt axis in a suitable direction. Alternatively, such forward or aft movement may be provided by first inducing a nose down or nose up pitch moment by varying the ratio of the moment or thrust between the aft and forward propulsion units, and in this orientation, the thrust has a horizontal component that propels the air vehicle forward or aft.

Additionally or alternatively, the system according to this embodiment may be configured to provide said variable control moment in the form of a yaw control moment in said aerodynamic flight by varying the said second thrust vector about said second tilt axis, which is aligned with the yaw axis when the tiltable propulsion unit is tilted to the aerodynamic flight position.

Additionally or alternatively, the system according to this embodiment may be configured to provide said variable control moment in the form of a roll control moment in said aerodynamic flight by suitably by suitably independently varying said respective thrusts of said two other propulsion units to generate a couple about the roll axis.

Additionally or alternatively, the system according to this embodiment may be configured to provide said variable control moment in the form of a pitch control moment in said aerodynamic flight by suitably varying said first thrust vector of said tiltable propulsion unit by tilting about said first tilt axis.

In at least this embodiment, said tiltable propulsion unit may comprise a respective motor that is tiltable with the rest of the respective propulsion unit, i.e., the motor is incorporated in the tiltable propulsion unit.

Said tiltable propulsion unit may optionally be configured for inducing a braking procedure for the respective motor while the respective tiltable propulsion unit is being tilted through a desired tilt angle to vary the respective thrust vector thereof.

In at least this embodiment, at least one said tiltable propulsion unit is a said tiltable ducted fan unit, wherein said respective motor is accommodated in said respective tiltable ducted fan unit and configured for driving the respective said fan. In at least one embodiment, at least one said tiltable propulsion unit is a said tiltable propeller unit, wherein said respective motor is configured for driving a respective propeller thereof.

According to the first aspect of the invention there is also provided a method for providing propulsion and control to an air vehicle, comprising, (A) providing the air vehicle with at least three propulsion units, each propulsion unit being configured for providing a selectively adjustable thrust and having a thrust vector at least alignable in a general vertical thrust vector direction, and wherein at least one said propulsion units is a tiltable propulsion unit and wherein said respective thrust vector is a first variable thrust vector configured to be selectively variable at least between said general vertical thrust vector direction and a general longitudinal thrust vector direction with respect to the air vehicle, and wherein said tiltable propulsion unit is further configured for providing a second thrust vector that is selectively variable; and (B) selectively operating said propulsion units to provide sufficient thrust to the air vehicle for:
  (i) vectored thrust flight, wherein said respective thrust vectors of said at least three propulsion units are aligned with said generally vertical thrust vector direction; and
  (ii) aerodynamic flight, wherein said first variable thrust vector of said tiltable propulsion unit is aligned with said generally longitudinal thrust vector direction;

(C) selectively generating variable control moments for control and stability of the air vehicle including:
  (a) controllably varying said respective thrust generated by each one of said at least three said propulsion units independently of one another;
  (b) controllably varying said first variable thrust vector provided by said tiltable propulsion unit independently of second variable thrust vector.

According to the first aspect of the invention, there is also provided an air vehicle comprising the propulsion and control system according to the first aspect of the invention, for example according to the first or second embodiments thereof as disclosed above, said air vehicle comprising a center of gravity and a body. The air vehicle may be configured for cruising in aerodynamic flight, and the body may be in the form of a flying wing, or may be in the form of a fuselage with wings attached thereto in fixed-wing relationship, for example. Alternatively, the air vehicle is not configured for aerodynamic flight, but for cruising wherein lift is provided by vectored thrust.

In at least some embodiments, the body may be a fuselage and comprise wings and empennage, wherein said wings and empennage are configured for providing aerodynamic lift and stability of the air vehicle in said aerodynamic flight. At least one of said wings and said empennage may be further configured for generating variable aerodynamic control moments for control of the air vehicle in said aerodynamic flight.

Optionally, and according to another aspect of the invention, for these or other embodiments, the empennage may be configured for selectively changing the position of said center of gravity and/or the aerodynamic center. For example, the empennage may be mounted to said fuselage or said wings via a second support structure, said second support structure being configured for adjusting a longitudinal spacing between said empennage and said fuselage or said wings, respectively. For example, said second support structure may be configured for facilitating said adjusting, and may be optionally further configured for facilitating mounting and dismounting of said empennage with respect to said fuselage or wings by a ground crew. Optionally, said second support structure may be configured for providing said adjusting in an automated manner.

According to another aspect of the invention, the said wings of these or other embodiments may be modular and selectable from a group of modular wing sets, wherein each said modular wing set is configured for being mountable in turn to said body for providing aerodynamic lift in forward flight. For example, at least one said modular wing set may be configured for providing said air vehicle with a performance different from that provided by another said modular wing set. For example, each said modular wing set is configured for facilitating mounting and dismounting of the respective modular wing set to said fuselage by a ground crew. According to this aspect of the invention, the air vehicle may also be operated in wingless mode by removing the wings.

Referring to the first embodiment of the propulsion and control system, the said first and second propulsion units may be mounted to the air vehicle forward of said center of gravity of the air vehicle, and wherein said third propulsion unit is mounted aft of said center of gravity; alternatively, the opposite arrangement may be provided, with the third propulsion unit mounted forward, and the first and second propulsion units mounted aft of said center of gravity.

Referring to the second embodiment of the propulsion and control system, the tiltable propulsion unit is mounted aft of said center of gravity, and the other two said propulsion units may be mounted to the air vehicle forward of said center of gravity of the air vehicle; alternatively, the opposite arrangement may be provided, with the tiltable propulsion unit mounted forward, and the other two propulsion units mounted aft of said center of gravity.

According to another aspect of the invention, the propulsion and control system of these or other embodiments may be further configured for selectively changing the position of said center of gravity.

For example, and referring to the first embodiment of the propulsion and control system, a relative position between said third propulsion unit and said tiltable propulsion units may be longitudinally adjustable, for example wherein said third propulsion unit is mounted to an aft end of said body via a first support structure, said first support structure being configured for adjusting a longitudinal spacing between said third propulsion unit and said aft end. The first support structure may be configured for facilitating said adjusting, and may be optionally further configured for facilitating mounting and dismounting of said third propulsion unit with respect to said body by a ground crew. Optionally, said first support structure is configured for providing said adjusting in an automated manner. Similar arrangements may be provide for the second embodiment of the propulsion and control system, mutatis mutandis.

Optionally, the air vehicle can be operated with the third propulsion unit removed.

According to the first aspect of the invention, there is also provided a method for operating an air vehicle, comprising:
    providing an air vehicle according to the first aspect of the invention;
    operating said propulsion units to generate sufficient longitudinal thrust for enabling aerodynamic flight;
    augmenting said aerodynamic control moments by operating said propulsion system for generating said variable control moments.

According to the second aspect of the invention, there is provided a modular air vehicle comprising:
    a body;
    a propulsion system;
    a group of modular wing sets, wherein each said modular wing set is configured for being mountable in turn to said body for providing aerodynamic lift in forward flight, wherein one said modular wing set is selected from said group and selectively mounted to said body; and
    an empennage.

At least one said modular wing set may be configured for providing said air vehicle with a performance different from that provided by another said modular wing set.

Each said modular wing set may be configured for facilitating mounting and dismounting of the respective modular wing set to said fuselage by a ground crew, although at least some embodiments can be configured for releasing the wings automatically, for example via explosive bolts, and thus dropping the wings when these are not desired, even while airborne—of course, lift for cruise is then provided by the propulsion system.

Such a propulsion system may comprise any suitable embodiment of the propulsion and control system according to the first aspect of the invention, for example.

According to the third aspect of the invention, there is provided a method for operating an air vehicle, said vehicle comprising at least one propulsion unit having a rotary component whereby rotation of said rotary component generates a thrust for operation of the propulsion unit, said propulsion unit being tiltable about a tilt axis between a first thrust direction and a second thrust direction, said method comprising implementing a braking procedure to said rotary component such as to stop or significantly reduce rotation thereof during at least a major portion of the tilting of said propulsion unit between said first thrust direction and said second thrust direction.

According to the third aspect of the invention, there is also provided an air vehicle comprising at least one propulsion unit having a rotary component whereby rotation of said rotary component is configured for generating a thrust for operation of the propulsion unit, said propulsion unit being tiltable between a first thrust direction and a second thrust direction, and comprising a braking arrangement configured for stopping or significantly reducing rotation of said rotary component during at least a major portion of the tilting of said propulsion unit between said first thrust direction and said second thrust direction.

According to the third aspect of the invention, there is also provided at least one propulsion unit for an air vehicle, the or each said propulsion unit having a rotary component whereby rotation of said rotary component is configured for generating a thrust for operation of the respective propulsion unit, the or each said propulsion unit being tiltable between a first thrust direction and a second thrust direction, and comprising a braking arrangement configured for stopping or significantly reducing rotation of said rotary component during at least a major portion of the tilting of said propulsion unit between said first thrust direction and said second thrust direction.

The tilt axis may be substantially orthogonal to the rotational axis of the rotary component.

The said first thrust direction may correspond to a general horizontal thrust position correlated to aerodynamic flight, and said second thrust direction may correspond to a general vertical thrust position, correlated to vectored thrust flight.

In at least some embodiments according to the third aspect of the invention, the rotary component may comprise any one of: a propeller or a spool of a turboprop unit; a spool or fan of a turbofan unit; a spool of a turbojet unit; a propfan (unducted fan); a propeller (shrouded or unshrouded); and the like.

The system and method according to the first aspect of the invention may include one or more features of the modular air vehicle according to the second aspect of the invention, mutatis mutandis, in any desired combination, and/or may include one or more features of the air vehicle and/or propulsion unit and/or method according to the third aspect of the invention, mutatis mutandis, in any desired combination.

The modular air vehicle according to the second aspect of the invention may include one or more features of the system and/or method according to the first aspect of the invention, mutatis mutandis, in any desired combination, and/or may include one or more features of the air vehicle and/or propulsion unit and/or method according to the third aspect of the invention, mutatis mutandis, in any desired combination.

The air vehicle and/or propulsion unit and/or method according to the third aspect of the invention, may include one or more features of the modular air vehicle according to the second aspect of the invention, mutatis mutandis, in any desired combination, and/or may include one or more features of the system and/or method according to the first aspect of the invention, mutatis mutandis, in any desired combination.

At least according to the first aspect of the invention, there is provided an air vehicle and methods of operation thereof based on a relatively simple base design concept which, at least for some embodiments, provides features of weight reduction and/or cost reduction and/or reliability, with respect to at least some known VTOL and V/STOL design concepts. For example, in some embodiments the motor of each propulsion unit may be accommodated in a respective duct, which simplifies design and facilitates integration of the propulsion units to the airframe, reducing manufacturing costs and/or replacement costs.

In at least one application, the air vehicle according to the first aspect of the invention may be in the form of a UAV, for example a tactical UAV, and at least some embodiments of the air vehicle according to this aspect of the invention may have one or more of the following features:

autonomous point vertical landing and takeoff, as well as regular take-off and landing;

hover and slow flight capabilities, including vectored thrust flight at below-stall velocities;

can compensate for gusts and winds;

simplicity in design;

low cost;

can provide performance in aerodynamic flight with reduced number of control surfaces or no control surfaces;

inherent fail safe configuration dependent on velocity/altitude conditions as per helicopters ("avoid curve");

easy to maneuver with respect to obstacles;

urban use;

can be launched from a mobile platform—car, aircraft, helicopter, ship, carrier UAV, etc;

no need for a special launcher system and/or a special capture system.

A feature of at least some embodiments according to the first and/or second and/or third aspects of the invention is that each respective tiltable propulsion unit may be configured having an external dimension and is located with respect to the aircraft in a manner such as to allow the air vehicle to take off and to land also in a conventional aerodynamic flight manner (i.e., non-VTOL), in which the respective tiltable propulsion unit(s) provide the forward thrust for so doing. Thus, when each respective tiltable propulsion unit is tilted so that its respective thrust vector is aligned with the general thrust vector direction, there is vertical clearance between the lower part of the outer profile of the respective tiltable propulsion unit and the ground when the air vehicle is in the parked position, for example.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 7(a), 7(b), 7(c) are a top view, front view and side view, respectively, of the embodiment of FIG. 1 in vectored thrust flight mode.

FIG. 15 is an exploded view of the embodiment of FIG. 13; FIG. 15a is a cross-sectional view of a support structure of the embodiment of FIG. 13.

DETAILED DESCRIPTION OF EMBODIMENTS

Figure 1:
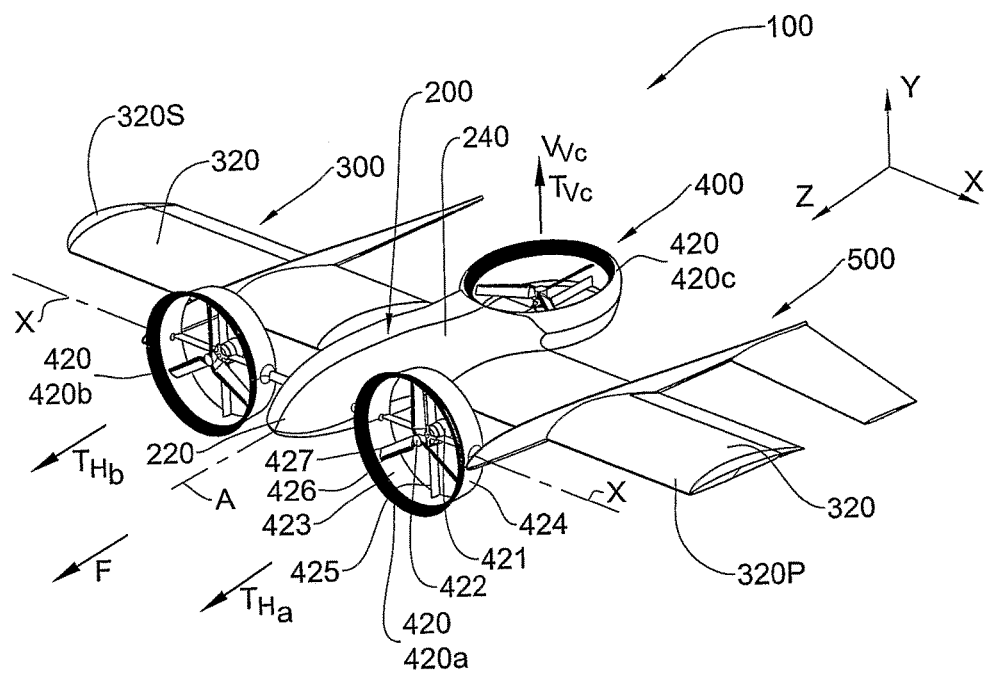
FIG. 1 is a front/top/side isometric view of an embodiment of the air vehicle of the invention in aerodynamic flight mode.
Figure 2:
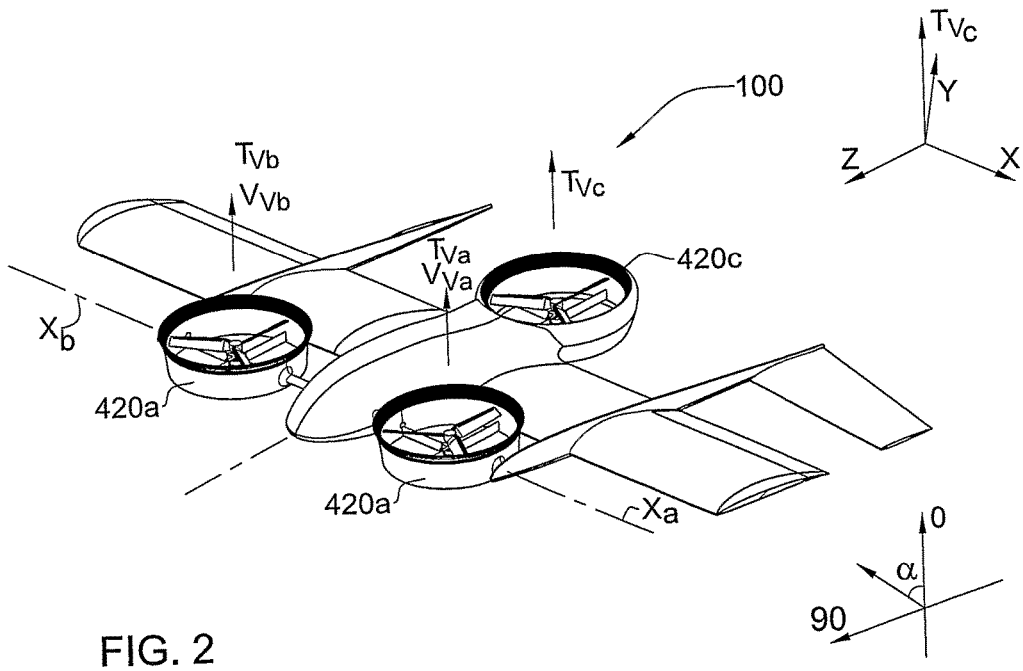
FIG. 2 is a front/top/side isometric view of the embodiment of FIG. 1, in vectored thrust flight mode.

Referring to FIGS. 1, 2, 3(a), 3(b), 3(c), 7(a), 7(b), 7(c) in particular, an air vehicle according to an embodiment of the invention, generally designated 100, comprises a main body in the form of fuselage 200, a wing arrangement 300, a propulsion system 400 and an empennage 500.

In this embodiment the air vehicle 100 also comprises a suitable undercarriage such as a tricycle undercarriage (not shown), which may be fixed or retractable. In alternative variations of this embodiment, the air vehicle may be provided without an undercarriage and comprises an alternative arrangement for cushioning a landing or is configured for landing onto a suitable cradle or soft cushioning material in VTOL configuration. In alternative variations of this embodiment, the air vehicle may be provided with a different undercarriage arrangement, The air vehicle 100 has a roll axis z aligned with the longitudinal axis A of the body or fuselage 200 and the direction of forward flight F, a pitch axis x, and a yaw axis y.

The air vehicle 100 in this embodiment is configured as a subsonic unmanned air vehicle (UAV), though in alternative variations of this embodiment the air vehicle may be manned and/or configured as a transonic and/or supersonic air vehicle.

The fuselage 200 comprises a nose 220 and an aft end 240, and longitudinal axis A is generally parallel to the direction of forward flight F. The fuselage 200 comprises a generally oblate cross-sectional area taken along transverse planes generally orthogonal to the direction of forward flight F.

Wing arrangement 300 is a fixed wing arrangement, comprising a port wing 320p and a starboard wing 320s, and thus, the port wing 320p and the starboard wing 320s are fixedly connected to the fuselage in a fixed geometrical relationship. It is to be noted that in alternative variations of this embodiment, the port wing 320p and the starboard wing 320s may be pivotably mounted to the fuselage to controllably change the sweep angle of the wings and optimize performance both in the low velocity and high velocity aerodynamic flight regimes (so-called variable geometry wings). In these or other alternative variations of this embodiment, the port wing 320p and the starboard wing 320s may each comprise a number of spanwise sections, which may be folded with respect to one another to minimize storage space, for example for parking in carriers and/or for facilitating stowage. In these or other alternative variations of this embodiment, the wings and fuselage may be in the form of a blended wing body (BWB) configuration.

In the illustrated embodiment, the port wing 320p and the starboard wing 320s are substantially identical mirror-images of one another, and thus unless specified otherwise, the reference numeral 320 will refer to each one of the wings 320s, 320p.

Figures 3A, 3B:
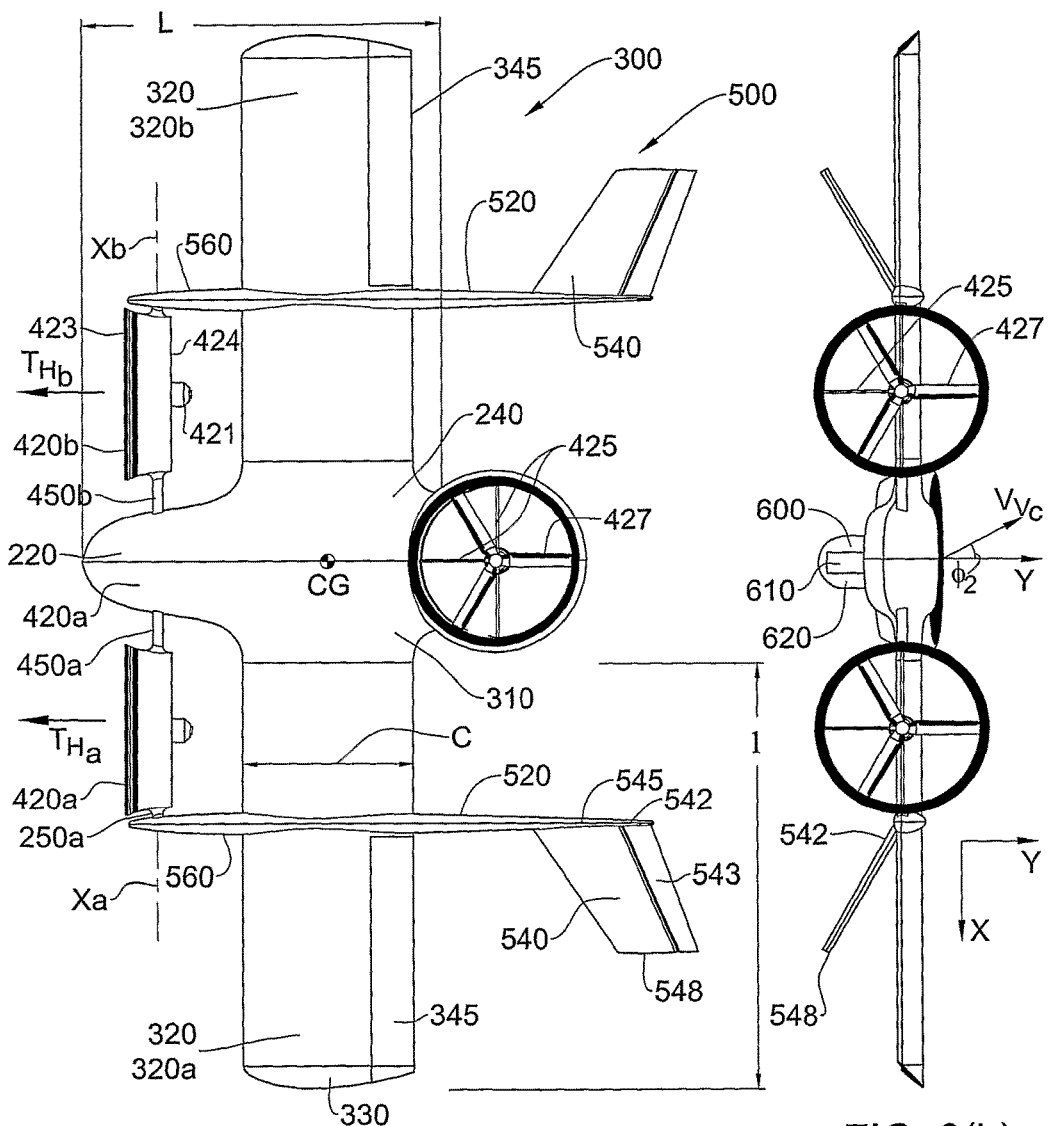
FIGS. 3(a), 3(b), 3(c) are a top view, front view and side view, respectively, of the embodiment of FIG. 1 in aerodynamic flight mode.

In the illustrated embodiment, and referring in particular to FIG. 3(a), each wing 320 has a chord c which is over 50% of the fuselage length L, and a forward portion 250 of the fuselage projects forward of the wings 320. The wings 320 each have an aspect ratio of about 2.6, zero dihedral or anhedral, zero sweep, a wing root 310 and a wing tip 330, span l, and control surfaces such as ailerons 345. In alternative variations of this embodiment, the wings may also comprise other control surfaces such as for example leading edge slats, flaps, and so on, and/or may have positive or negative sweep, and/or anhedral or dihedral, and/or an aspect ratio different from 2.6.

Figure 3C:
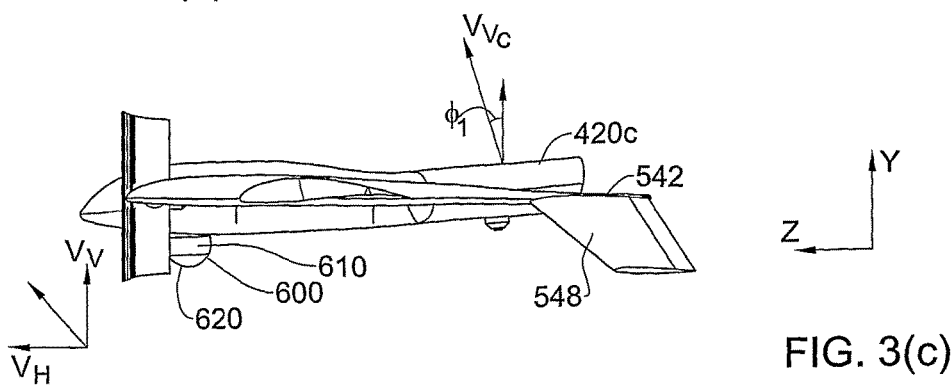

Referring particularly to FIGS. 3(a) to 3(c), empennage 500 comprises a pair of laterally spaced booms 520, a port boom 520 connected to the port wing, and a starboard boom 520 connected to the starboard wing. Each boom 520 projects in an aft direction from the respective wing 320, generally intermediate between the respective wing root and wing tip. A fin 540 is anhedrally mounted to each boom 520 at the respective boom aft end 545 so that the respective fin tip 548 is below and outboard with respect to the respective fin root 542, and thus the two fins 540 are in diverging relationship. Each fin 540 comprises a control surface 543 at the trailing edge thereof that operates both as a rudder and as a vertical stabilizer in the aerodynamic flight regime of the air vehicle. Each boom 520 has a forward boom portion 560 that projects forward of the leading edge of the respective wing 320. In alternative variations of this embodiment, any suitable alternative configuration for empennage 500 may be provided, taking into account the structure and function of the aft ducted fan unit 420c.

Referring to FIG. 1 and FIGS. 3(a) to 3(c), for example, propulsion system 400 is configured as a propulsion and control system for the air vehicle, and comprises three propulsion units in the form of three ducted fan units—a pair of forward-mounted vectored ducted fan units 420a, 420b, and a single, aft-mounted, non-tiltable ducted fan unit 420c, in triangular spatial arrangement in plan view enclosing the center of gravity CG of the air vehicle. In alternative variations of this embodiment, one propulsion unit (configured for providing vectored thrust or configured for providing fixed thrust vector) is provided at the front of the air vehicle, or at least forward of the center of gravity CG, and a pair of vectored thrust propulsion units is provided at the aft end, or at least aft of the center of gravity CG of the air vehicle.

In this embodiment, the ducted fan unit 420c is located at the aft end of the fuselage 200, for example to minimize drag, and is generally aligned vertically with the wings 320, i.e., when longitudinal axis A is horizontal, the ducted fan unit 420c is at about the same general height as the fuselage 200 and the wings 320.

The air vehicle 100 further comprises a suitable control system (not shown) for operating the propulsion system 400, in particular the magnitudes of each of the thrusts $T_a$, $T_b$, $T_c$ generated by ducted fan units 420a, 420b, 420c, respectively, independently of one another, and the thrust vectors $V_a$ and $V_b$ of the ducted fan units 420a, 420b, respectively, independently of one another.

Unless specified otherwise, the reference numeral 420 refers to each one of the ducted fan units 420a, 420b, 420c. Each ducted fan unit 420 comprises a motor 421 centrally mounted within a respective duct 422 via internal struts 425, the duct 422 having a duct inlet 423 and a duct outlet 424. Each motor 421 is coupled to and powers a respective fan 426, which in this embodiment has a plurality of blades 427 in fixed pitch relationship. In operation, each ducted fan unit 420 generates a thrust vector in the general direction from the respective duct outlet 424 to the respective duct inlet 423, as the ducted fan units 420 have an absence of fixed vanes and/or an absence of movable vanes for controlling the thrust vector of the respective ducted fan unit 420, though in alternative variations of this embodiment at least one ducted fan unit may comprise some fixed vanes. Each ducted fan unit 420 is configured for providing an individually controllable thrust level, which may be controllably increased or decreased from any suitable datum setting as required.

In alternative variations of this embodiment, at least one ducted fan unit 420 may comprise a plurality of fans driven by the respective motor.

In alternative variations of this embodiment, at least one ducted fan unit 420 may comprise a plurality of motors for driving the respective fan(s).

In the illustrated embodiment, all three ducted fan units 420 are configured as mutually co-rotating (i.e., the fans all turn in the same direction with respect to the duct) and are of similar construction (except for the mounting arrangement to the air vehicle), simplifying manufacture and logistics, and reducing manufacturing and ownership costs.

The air vehicle 100 is also configured for providing a braking procedure to each ducted fan unit 420, thereby enabling the motor 421 of each ducted fan unit 420 to be stopped or at least considerably slowed down, in a relative short time period, for example less than 1 second, thus destroying or significantly reducing the angular momentum of the motor rotor and fan 426. In some alternative variations of this embodiment, the braking feature is only provided for each ducted fan unit that is tiltable with respect to the fuselage.

For example, the braking feature may comprise a braking arrangement in the form of a mechanical brake provided with the respective motor 421, which, when actuated, stops (or significantly reduces) the rotation of the rotor of the respective motor 421 and thus also of the respective fan 426. Additionally or alternatively, and particularly in embodiments where the motor 421 is a DC electric motor, the braking feature may comprise suitably reversing the direction of the current provided to the motor and then switching off the motor, or may instead comprise providing a short circuit to the motor via the respective electronic speed control (ESC), which stops the motor. Alternatively, the braking feature may comprise switching off the motor 421, and using the drag and/or friction acting on the spinning fan 426 for braking the rotational speed thereof. The purpose of this braking feature will become clearer below.

In the illustrated embodiment, the thrust generated by each of the three ducted fan units 420 may be variably adjusted by independently controlling the rpm of the respective motor, and thus of the respective fan 426. In alternative variations of this embodiment, at least one fan comprises a plurality of variable pitch blades, and the thrust generated by the respective fan may be variably adjusted by controlling the rpm and/or by controlling the pitch of the blades.

The aft ducted fan unit 420c is attached to the fuselage aft end 240 in fixed spatial orientation with respect thereto, such that the thrust vector $V_{Vc}$ of ducted fan unit 420c, and the rotational axis of its respective fan 427, is fixed generally parallel to the yaw axis y or slightly inclined thereto and pointing in a generally upwards direction with respect to the fuselage 200. In this embodiment, and referring to FIGS. 3(b) and 3(c) in particular, the thrust vector $V_{Vc}$ of ducted fan unit 420c (and the rotational axis of its respective fan 427), is fixedly inclined (at least selectively fixedly inclined) in a forward direction by an acute angle $\phi_1$ along the z-y plane, and in a lateral direction by an acute angle $\phi_2$ along the x-y plane with respect to the yaw axis. A feature of having the forward tilt of angle $\phi_1$ along the z-y plane is that the air vehicle may hover with the nose 220 in a slight nose-up position when the thrust vector $V_{Vc}$ is vertical, providing a positive angle of attack for the wings, and thus maximizes or at least makes further use of wing lift that may be generated as a result of any wind that flows over the air vehicle, thus reducing part of the need for vectored thrust during hover. A feature of having the sideways tilt of angle $\phi_2$ along the x-y plane is that this provides a thrust vector component in the pitch axis direction that can be used to compensate for a baseline yaw that is naturally generated by the co-rotation of the fans of three fan units during hover at a particular design point—further compensation at conditions off this design point may be provided by the forward fan units, as will be described below in greater detail.

In this or other alternative variations of this embodiment, the aft ducted fan unit 420c may be further configured for being controllably tilted about a pitch axis to provide a horizontal thrust vector for providing propulsion in the forward flight direction F, for example, and/or may be configured for being controllably tilted about a roll axis to provide a horizontal thrust vector in a direction parallel to the pitch axis x to provide yawing moments and/or side slip movements.

Forward ducted fan unit 420a is rotatably mounted between the fuselage forward portion 250 and the respective forward boom portion 560 of the port wing 320p via journals 450a, to enable the ducted fan unit 420a to be reversibly tilted about axis $X_a$ with respect to the fuselage 200 about any desired tilt angle α, at least between a tilt angle α of zero degrees and 90 degrees. Tilt angle α of zero degrees corresponds to the general vertical thrust position shown in FIG. 2 in which the thrust vector $V_{Va}$ is substantially parallel to the yaw axis y, and tilt angle α of 90 degrees corresponds to the general longitudinal thrust position shown in FIG. 1 in which the thrust vector $V_{Ha}$ is substantially parallel to the roll axis z and points in direction F. Axis $X_a$ is substantially parallel to the pitch axis x of the air vehicle 100 and intersects the rotational axis of the respective fan 426. Optionally, the ducted fan unit 420a may be further tilted about axis $X_a$ in either direction past the horizontal thrust position or past the vertical thrust position to provide a thrust vector $V_a$ at any other suitable angle to the longitudinal axis A, for example such as to provide any thrust vector including a partial or full downward thrust (angle α between about 90 degrees and about 270 degrees) or a partial or full reverse thrust (angle α between about 0 degrees and about −180 degrees (or between about 180 degrees and about 360 degrees)) i.e. in a direction opposite to direction F.

A suitable drive mechanism (not shown) is provided for independently and controllably driving the tilting of each of the two forward ducted fan units 420a and 420b to controllably vary the respective thrust vector, i.e., the angular position of the respective thrust generated by the respective propulsion unit, independently of one another. The drive mechanism is configured for tilting the ducted fan units 420*a* and 420*b* in a relatively fast manner, and provide very quick and accurate response to tilting commands (in terms of direction and angular displacement) provided by the control system.

Forward ducted fan unit 420*b* is rotatably mounted between the forward portion 250 and the respective forward boom portion 560 of the starboard wing 320*s* via journals 450*b*, to enable the ducted fan unit 420*b* to be reversibly tilted about axis $X_b$ with respect to the fuselage 200 about any desired tilt angle β, at least between a tilt angle β of zero degrees and 90 degrees. Tilt angle β of zero degrees corresponds to the vertical thrust position shown in FIG. 2 in which the thrust vector $V_{Va}$ is substantially parallel to the yaw axis y, and tilt angle β of 90 degrees corresponds to the horizontal thrust position shown in FIG. 1 in which the thrust vector $V_{Ha}$ is substantially parallel to the roll axis and points in direction F. Axis $X_b$ is substantially parallel to the pitch axis x of the air vehicle 100 and intersects the rotational axis of the respective fan. Optionally, the ducted fan unit 420*b* may be further tilted about axis $X_b$ in either direction past the horizontal thrust position or the vertical thrust position to provide a thrust vector $V_b$ at any other suitable angle to the longitudinal axis A, for example such as to provide any thrust vector including a partial or full downward thrust (angle β between about 90 degrees and about 270 degrees) or a partial or full reverse thrust (angle β between about 0 degrees and about −180 degrees (or between about 180 degrees and about 360 degrees)) i.e. in a direction opposite to direction F.

In at least this embodiment, the tilt axes $X_a$, $X_b$ are coaxially aligned.

In alternative variations of this embodiment, the tilt axes $X_a$, $X_b$ may be each set at a modest angle to the pitch axis x and/or yaw axis y and/or roll axis z so as to provide a desired thrust vector component along one or more of the roll, pitch or yaw axes, respectively. For example, it may be desired to have the thrust vectors $V_a$ and $V_b$ in the vertical thrust position in a mutually converging or diverging relationship when viewed from the front of the air vehicle. Converging thrust vectors may delay the formation of an upwash fountain between the front propulsion units, while diverging thrust vectors may provide natural stability in roll during landing and take-off, for example.

The motors 421 for the three ducted fan units 420*a*, 420*b*, 420*c* may each be electrically powered (i.e., the motors may be electric motors) or fuel powered (for example the motors may be combustion engines), or each ducted fan unit may comprise hybrid motor. Alternatively, the motors 421 may be different one from another, and the three ducted fan units 420*a*, 420*b*, 420*c* may include a permutation between the three types of motor and/or different types of motor, for example aft ducted fan unit 420*c* may be fuel powered, while the forward ducted fan units 420*a*, 420*b* may be electric motors, or aft ducted fan unit 420*c* may be an electric motor, while the forward ducted fan units 420*a*, 420*b* may be fuel powered. In each case, power or fuel to the motor 421 is provided from a suitable electrical power supply or fuel tank, respectively, comprised in the fuselage 200 and/or wings 320 via suitable lines, typically routed to the respective motor 421 via one or more respective struts 425.

In alternative variations of this embodiment, the motors may be located outside of the ducted fan unit, for example in the fuselage or wings, and are coupled to the respective fan via a suitable coupling, for example a rotatable coupling for allowing the forward mounted ducted fan units to tilt.

In this embodiment, the air vehicle 100 further comprises a payload 600 in the form of a surveillance package, comprising image acquisition system 610 enclosed in a suitable radome or fairing 620, provided on the underside of the air vehicle, close to the nose thereof. For example, image acquisition system 610 may include one or more optical or IR imaging cameras which are pointing in the general Earth direction. In alternative variations of this embodiment, the payload may be omitted, or alternatively may located at a different position on the fuselage or wings, or alternatively a different payload may be provided, internally or externally of the fuselage and/or the wings; such a payload may comprise, for example, sensors, radar systems, COMINT equipment, electronic countermeasures, stores, delivery system therefor, and so on.

The air vehicle 100 is configured for controllably, selectively and independently varying the thrust vectors $V_a$ and $V_b$ by the changing tilt angle α independently from tilt angle β. This feature provides at least differential and selective tilt control for the thrust vectors generated by each one of the forward ducted fan units 420*a*, 420*b*, independently of the other forward ducted fan unit. Nevertheless, the forward ducted fan units 420*a*, 420*b* can also be operated to tilt together in the same direction and through the same or different angular displacement one from the other. Furthermore, the air vehicle 100 is configured for controllably and selectively changing the magnitude of the thrust $T_a$, $T_b$, $T_c$ generated by each of the ducted fan units 420*a*, 420*b*, 420*c*, respectively, independently of one another. The air vehicle 100 is also configured for controllably and selectively changing the magnitude of the thrust $T_a$, $T_b$, generated by each of the forward ducted fan units 420*a*, 420*b*, respectively, independently of one another, and also independently of the magnitude of the respective tilt angles α, β thereof, i.e., of the thrust vectors $V_a$ and $V_b$, which may also be controllably and selectively varied independently one from the other.

Referring to FIGS. 3(*b*) and 3(*c*), for example, it is evident that in the illustrated embodiment the forward ducted fan units 420*a*, 420*b* are mounted at a position with respect to the wings and fuselage, and have a particular external profile, in particular an external dimension, that allows the air vehicle to take off and to land (in non-VTOL mode) with the forward ducted fan units 420*a*, 420*b* providing the required thrust for aerodynamic flight, without colliding with the ground. In other words, the external dimension (in this case outer diameter) of the forward ducted fan units 420*a*, 420*b* is sufficiently small, given the location of the forward ducted fan units 420*a*, 420*b* on the air vehicle, such as to provide a vertical clearance between the forward ducted fan units 420*a*, 420*b* and the ground, at least when the air vehicle is parked. This allows the air vehicle to be operated fully also as a conventional (non-VTOL) air vehicle.

The air vehicle 100 may be operated at least in an aerodynamic flight regime, in a vectored thrust flight regime, and in an augmented aerodynamic flight regime, for example as follows.

Aerodynamic Flight Mode

In the aerodynamic flight regime, the air vehicle 100 may be operated exclusively in aerodynamic flight mode (also referred to herein as "aerodynamic flight"), in which the air vehicle has sufficient forward velocity to enable sufficient aerodynamic lift to be generated by the air vehicle, in this embodiment by the wings 320, and for pitch roll and yaw control to be provided via the control surfaces 345 and 543. The two forward mounted ducted fan units 420a, 420b are in nominal horizontal or longitudinal mode, with the respective tilt angles α, β nominally set at 90 degrees, to provide thrust vectors $V_{Ha}$ and $V_{Hb}$, respectively in the general forward flight direction F, and thrusts $T_a$ and $T_b$ are nominally equal. In this flight mode, the air vehicle 100 operates within its flight envelope in a similar manner to that of conventional fixed-wing aircraft.

The aft ducted fan unit 420c may be inoperative in the aerodynamic flight mode, or alternatively may be operated to generate zero thrust or close thereto, for example by suitably pitching the fan blades 427 in embodiments where these are configured as variable pitch blades, and/or by reducing the rpm of the fans. Particularly in alternative variations of this embodiment in which the air vehicle is configured for operating as a transonic and/or supersonic air vehicle, suitable covers may be provided for closing the duct outlet and the duct inlet of the aft ducted fan unit 420c, to reduce drag.

In the illustrated embodiment, the fans 426 of the three ducted fan units 420 are co-rotating with respect to one another, i.e., rotate in the same direction. In aerodynamic flight mode, the co-rotation of the fans 426 of the forward mounted ducted fan units 420a, 420b can lead to an undesired roll, and this effect can be compensated for in this embodiment in at least two ways. According to one such way or method, a compensating roll is provided to the air vehicle 100 by differentially tilting the ducted fan units 420a, 420b in opposite directions about the nominal respective tilt angle 90 degree positions. This varies the direction of the thrust vector $V_a$ provided by forward ducted fan unit 420a relative to the direction of the thrust vector $V_b$ provided by forward ducted fan unit 420b, and thus creates two thrust components that form a couple in the opposite sense to the roll induced by the co-rotating fans. The tilt angles may be chosen so that the couple equalizes and thus cancels the induced roll. In a second way or method, the control surfaces 345 and 543 are operated to compensate for the induced roll. In alternative variations of the illustrated embodiment, the fans 426 of the forward mounted ducted fan units 420a, 420b can be configured to rotate in opposite directions, and thus do not generate the aforesaid undesired roll.

Vectored Thrust Flight Mode

In the vectored thrust flight regime, the air vehicle 100 may be operated exclusively in vectored thrust flight mode (also referred to herein as "vectored thrust flight", or as "VTOL operations"), in which all the lift, movement and control of the air vehicle are provided by the propulsion system 400, under the control of the control system.

For VTOL operations, the forward ducted fan units 420a, 420b are tilted to the nominal vertical position, in which tilt angles α, β are set at nominally zero degrees, and all three ducted fan units 420 provide vertical thrust. In the illustrated embodiment, the center of gravity CG of the air vehicle is located generally centrally with respect to the three ducted fan units 420a, 420b, 420c (see FIG. 7(a)), and thus the three ducted fan units generate nominally the same thrust levels: for VTOL take-off the combined thrust of the three ducted fan units initially exceeds the take-off weight of the air vehicle to provide an upward velocity, after which the combined thrust may be balanced with the weight. For VTOL landing, the combined thrust that may be generated by the three ducted fan units is reduced to less than the weight of the air vehicle to provide a downward velocity (after which the thrust may be balanced to the weight), sufficient to at least guarantee a soft landing during regular operation of the air vehicle 100.

In alternative variations of this embodiment, where the center of gravity is located closer to or further away from the aft ducted fan unit 420c than with respect to the forward ducted fan units 420a, 420b, and the ratio of the thrust provided by the aft ducted fan unit 420c relative to the forward ducted fan units 420a, 420b is correspondingly such as to provide pitch balance to the air vehicle. The relative thrust split between the aft ducted fan unit 420c relative to the forward ducted fan units 420a, 420b can also be controlled to offset a longitudinal shift in the position of the CG, for example related to the location, size or absence of the payload. Additionally or alternatively, the relative thrust split between the two forward ducted fan units 420a, 420b can also be controlled to offset a lateral shift in the position of the CG that is for example inherent in the air vehicle design or that is related to the location, size or absence of the payload—for example where a stores on one wing is jettisoned while retaining a similar stores on the other wing.

In the vectored thrust flight regime, the propulsion system 400 also allows the air vehicle 100 to hover over an area, and also to move in a forward or aft direction, and/or to move in a port or starboard side direction, and/or to increase or decrease the altitude of the air vehicle 100, and/or to provide pitch, yaw and roll control to the air vehicle 100.

Hovering over a fixed area is accomplished by maintaining the combined thrust of the propulsion system 400 balanced with the weight of the air vehicle 100, and changes in altitude are provided by selectively increasing or decreasing the combined thrust until the desired rate of climb is achieved, after which the combined thrust is against balanced with the air vehicle weight, followed by deceleration to eliminate climb at the desired altitude.

Figure 8:
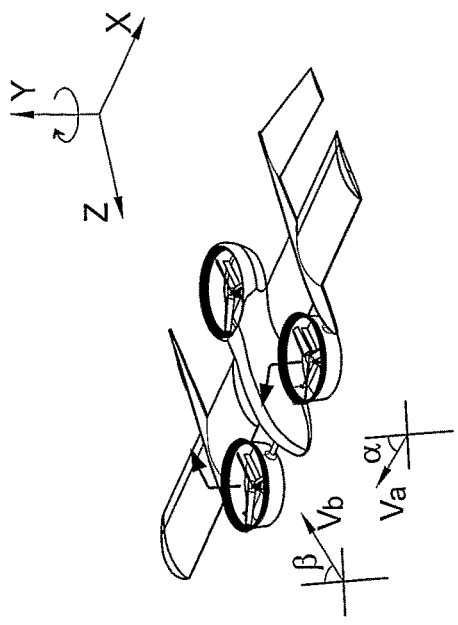
FIG. 8 is a front/top/side isometric view of the embodiment of FIG. 1 providing pitch control in vectored thrust flight mode.

Referring to FIG. 8, pitch control of the air vehicle 100 is provided by varying the ratio of the moment provided by the aft ducted fan unit 420c relative to the combined moment of the forward ducted fan units 420a, 420b, while their tilt angles are nominally set at zero degrees. Since in this embodiment the moment arms of the various ducted fan units is constant, pitch control is provided by varying the ratio of thrust $T_c$ provided by the aft ducted fan unit 420c relative to the combined thrust $(T_a+T_b)$ of the forward ducted fan units 420a, 420b—nose up pitch is generated when $T_c$ is less than $(T_a+T_b)$, and vice versa, i.e., nose down pitch is generated when $T_c$ is greater than $(T_a\ T_b)$. In alternative variations of this embodiment in which at least one propulsion unit is mounted to the air vehicle in a manner allowing for the moment arm thereof with respect to the center of gravity to me varied, pitch control may be provided by varying the ratio of the moment arm of the aft unit with respect to the moment arm of the forward units, and/or by suitably varying the ratio of the thrusts.

Figure 9:
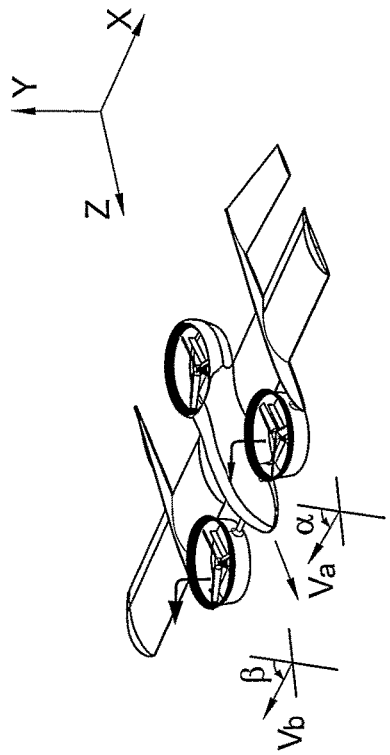
FIG. 9 is a front/top/side isometric view of the embodiment of FIG. 1 providing yaw control in vectored thrust flight mode.

Referring to FIG. 9, yaw control of the air vehicle 100 is provided by varying the direction of the thrust vector $V_a$ provided by forward ducted fan unit 420a relative to the direction of the thrust vector $V_b$ provided by forward ducted fan unit 420b, i.e., by differentially tilting the ducted fan units 420a, 420b about the nominal respective tilt angle zero degree positions. Yaw in one direction is generated when tilt angle α is positive and tilt angle β is negative, such that the respective thrust vectors $T_a$, $T_b$ have a forward component and an aft component, respectively, and vice versa. During a pure yaw maneuver, the propulsion system is operated to maintain a balance (in pitch and roll), and the aft ducted fan unit 420c and/or the forward ducted fan units 420a, 420b may be operated such that the vertical thrust component of combined thrust ($T_a+T_b$) of the forward ducted fan units 420a, 420b balances that of thrust $T_c$, and such that the vertical thrust components of thrusts $T_a$ and $T_b$ are substantially balanced.

Figure 10:
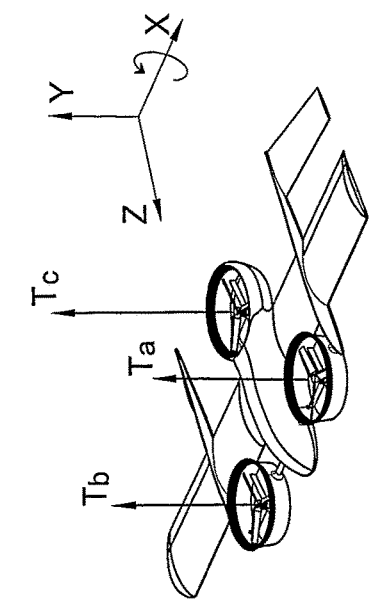
FIG. 10 is a front/top/side isometric view of the embodiment of FIG. 1 providing roll control in vectored thrust flight mode.

Referring to FIG. 10, roll control of the air vehicle 100 is provided by varying the ratio of the moment provided by forward ducted fan unit 420a relative to the moment provided by forward ducted fan unit 420b, while their tilt angles are nominally set at zero degrees, in this embodiment by varying the ratio of the thrust $T_a$ provided by forward ducted fan unit 420a relative to the thrust $T_b$ provided by forward ducted fan unit 420b. Roll in one direction is generated when $T_a$ is greater than $T_b$, and vice versa. During a pure roll maneuver, the propulsion system is operated to maintain a balance (in pitch), and the aft ducted fan unit 420c and/or the forward ducted fan units 420a, 420b may be operated such that the vertical thrust component of combined thrust ($T_a+T_b$) of the forward ducted fan units 420a, 420b balances that of thrust $T_c$. In alternative variations of this embodiment in which at least one propulsion unit is mounted to the air vehicle in a manner allowing for the moment arm thereof with respect to the center of gravity to me varied, roll control may be provided by varying the ratio of the moment arm of one forward unit with respect to the moment arm of the other forward unit, and/or by suitably varying the ratio of the thrusts.

Figure 11:
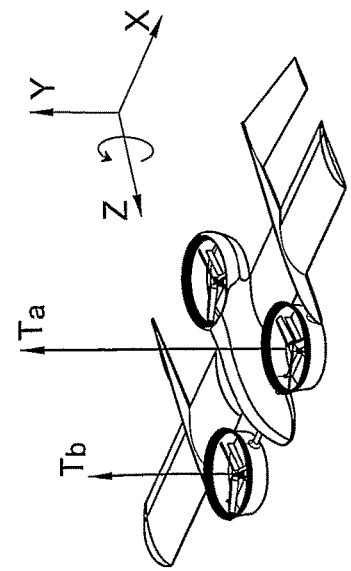
FIG. 11 is a front/top/side isometric view of the embodiment of FIG. 1 providing forward/aft motion in vectored thrust flight mode.

Referring to FIG. 11, forward and aft motion of the air vehicle 100 in hover is provided by varying the direction of the thrust vectors $V_a$, $V_b$ of the thrust provided by forward ducted fan units 420a, 420b, respectively, in the same manner, i.e., by tilting the two ducted fan units 420a, 420 in the same direction about the nominal respective tilt angle zero degree positions. Movement in the forward direction is generated when tilt angles α and β are positive, such that the respective thrusts $T_a$, $T_b$ both have a forward component, and vice versa. The magnitude of the tilt angles α and β are the same if the thrust generated by the two forward ducted fan units 420a, 420b are also the same; alternatively, providing different magnitudes for angles α and β may be compensated by providing different magnitudes for the respective thrust vectors $V_a$, $V_b$. During a pure forward or aft maneuver, the propulsion system is operated to maintain a balance (in pitch, roll and yaw), and the aft ducted fan unit 420c and/or the forward ducted fan units 420a, 420b may be operated such that the vertical thrust component of combined thrust ($T_a+T_b$) of the forward ducted fan units 420a, 420b balances that of thrust $T_c$ and such that the vertical thrust components of thrusts $T_a$ and $T_b$ are substantially balanced, and such that the horizontal thrust components of thrusts $T_a$ and $T_b$ are substantially balanced.

Additionally or alternatively, forward or aft motion of the air vehicle 100 in hover may be provided by first inducing a pitch maneuver as disclosed above with reference to FIG. 8, so that the air vehicle is pitched to a particular pitch angle, nose down for forward motion (and nose up for aft motion), such that, maintaining this pitch angle, each thrust $T_a$, $T_b$ $T_c$, now has a forward component (or aft force component, respectively) to provide the desired forward motion (or aft motion, respectively) to the air vehicle.

Lateral or sideways motion (i.e., in a direction parallel to the pitch axis) of the air vehicle 100 in hover is provided by first inducing a roll maneuver as disclosed above with reference to FIG. 10, so that the air vehicle is rolled to a particular roll angle, such that, maintaining this roll angle, each thrust $T_a$, $T_b$ $T_c$ now has a lateral force component to provide the desired lateral motion to the air vehicle.

It is clearly evident that the air vehicle may be operated to provide any suitable forward/aft motion, and/or lateral movement, and/or pitch, and/or yaw, and/or roll, by suitably combining the operations of the propulsion system 400 as disclosed above regarding FIGS. 8 to 11. Furthermore, during a pitch and/or roll and/or yaw maneuver, the propulsion system may be operated to maintain the required overall thrust.

In the illustrated embodiment, the fans 426 of the three ducted fan units 420 are co-rotating with respect to one another, i.e., rotate in the same direction with respect to one another. In hover mode, the co-rotation of the fans 426 may generate an undesired yaw, and this effect can be compensated in a number of ways, for example as follows. A compensating yaw may be provided to the air vehicle 100 by differentially tilting the ducted fan units 420a, 420b about the nominal respective tilt angle zero degree positions. This varies the direction of the thrust vector $V_a$ provided by forward ducted fan unit 420a relative to the direction of the thrust vector $V_b$ provided by forward ducted fan unit 420b, and thus creates two horizontal thrust components (in opposite directions) that form a couple in the opposite sense to the yaw induced by the co-rotating fans.

As mentioned above, the aft ducted fan unit 420c may be fixed with its thrust axis having a fixed sideways tilt of angle $\phi_2$ along the x-y plane, which provides a thrust vector component parallel to the pitch axis direction that can be used to partially or fully compensate for this yaw. For example, this yaw compensation feature of the aft ducted fan unit 420c may be used for compensating for the yaw that is naturally generated by the co-rotation of the fans of three fan units during hover at a particular design point, while further compensation at conditions off this design point may be provided by differentially tilting the ducted fan units 420a, 420b about the nominal respective tilt angle zero degree positions as described above to provide the desired additional yaw compensation (which may be to increase or decrease the yaw compensation provided by the aft ducted fan unit 420c, as desired).

Alternatively, the aft ducted fan unit 420c may be provided with a particular sideways tilt angle $\phi_2$ along the x-y plane, such as to provides a thrust vector component in the pitch axis direction that can be used to compensate for the yaw induced by the aft duct unit 420c, and differentially tilting of the ducted fan units 420a, 420b about the nominal respective tilt angle zero degree positions may be provided as described above, mutatis mutandis, to provide yaw compensation for the yaw induced by the two co-rotating fans of the ducted fan units 420a, 420b (in alternative variations of the embodiment, the ducted fan units 420a, 420b may have mutually counter-rotating fans, so that no net yaw is generated by the rotation of the fans, and thus no additional compensation is required).

Augmented Aerodynamic Flight Mode

In the augmented aerodynamic flight regime, the air vehicle 100 may be operated in augmented aerodynamic flight mode, in which control of the air vehicle is augmented or fully provided by the propulsion system 400, under the control of the control system.

Figure 4:
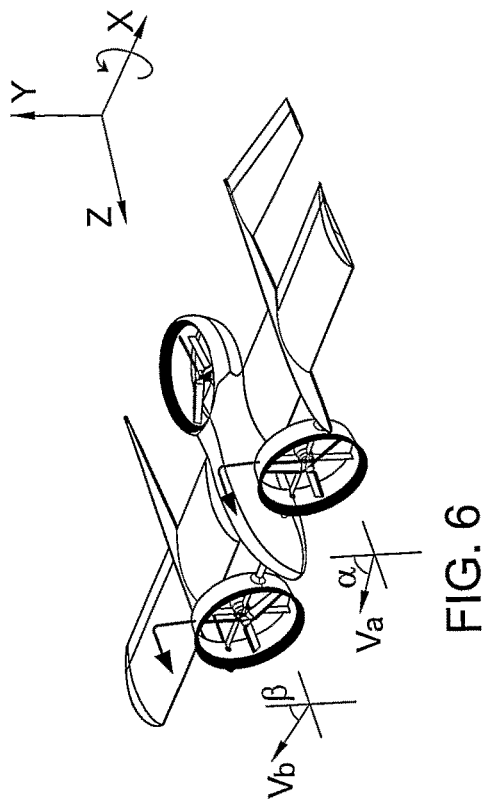
FIG. 4 is a front/top/side isometric view of the embodiment of FIG. 1 providing augmented roll control in aerodynamic flight mode.
Figure 5:
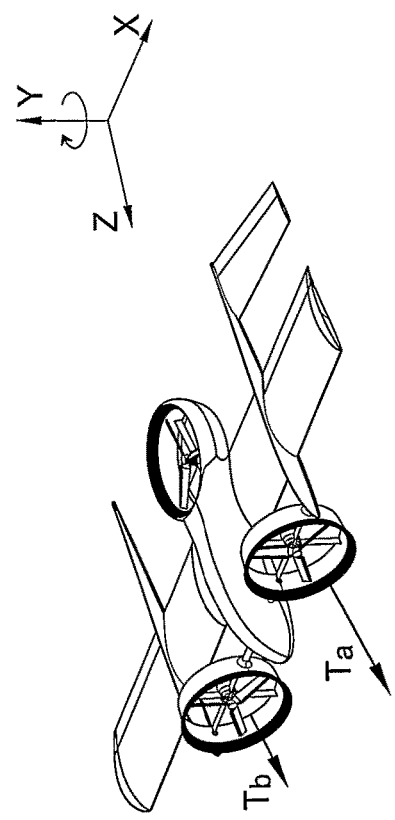
FIG. 5 is a front/top/side isometric view of the embodiment of FIG. 1 providing augmented yaw control in aerodynamic flight mode.
Figure 6:
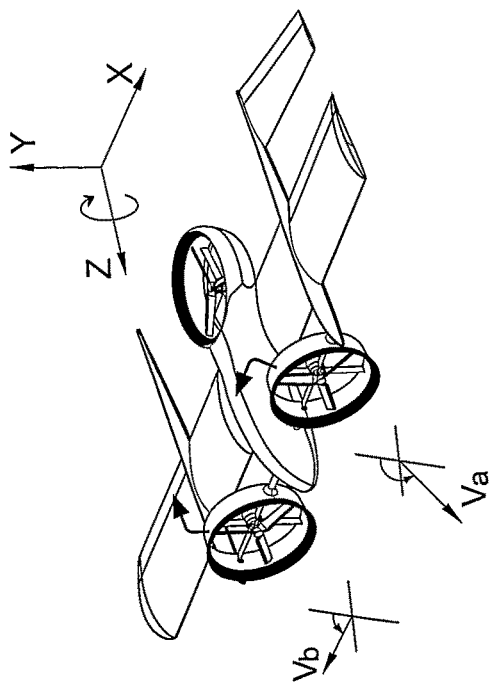
FIG. 6 is a front/top/side isometric view of the embodiment of FIG. 1 providing augmented pitch control in aerodynamic flight mode.

Thus, and referring to FIGS. 4 to 6, the propulsion system 400 can also be used to augment the operation of control surfaces 345 and 543 to provide enhanced pitch, roll and yaw control also when the air vehicle is operating in the aerodynamic flight mode. Alternatively, the air vehicle 100 may be designed with weaker aerodynamic direction control, for example having smaller control surfaces 345 and 543 (than would otherwise be required in the absence of the aforementioned augmented control provided by propulsion system 400), which can provide weight and cost advantages, and pitch/yaw and roll control is supplemented by means of the propulsion system 400. Alternatively, the air vehicle 100 may be designed with no aerodynamic direction control, i.e. without having control surfaces 345 and 543, which can provide weight and cost advantages, and pitch/yaw/roll control is provided exclusively by means of the propulsion system 400. Alternatively, the air vehicle 100 may be designed with the control surfaces 345 and 543 as a redundant direction control system, for use in case of failure of the direction control otherwise provided exclusively by the propulsion system 400, or vice versa, where the propulsion system 400 is operated as a redundant direction control system, for use in case of failure of the aerodynamic direction control provided by the control surfaces 345 and 543.

For example, as illustrated in FIG. 4, augmented roll control of the air vehicle 100 (in addition to or instead of roll control provided by control surfaces 345 operating as ailerons) is provided by varying the direction of the thrust vector $V_a$ provided by forward ducted fan unit 420a relative to the direction of the thrust vector $V_b$ provided by forward ducted fan unit 420b, i.e., by differentially tilting the ducted fan units 420a, 420b about the nominal respective tilt zero degree positions. Roll in one direction is augmented when tilt angle α is less than 90 degrees and tilt angle β is more than 90 degrees, such that the respective thrust vectors $V_a$, $V_b$ have an upward component and a downward component, respectively (in front view), and vice versa. Where the thrusts $T_a$, $T_b$ provided by the front ducted fan units 420a, 420b are equal, the magnitude of the respective tilt angles above and below the 90 degree position is the same.

Referring to FIG. 5, augmented yaw control of the air vehicle 100 (in addition to or instead of roll control provided by control surfaces 543 operating as a rudder) is provided by varying the ratio of the moment, specifically thrust $T_a$ provided by forward ducted fan unit 420a relative to the moment, specifically thrust $T_b$ provided by forward ducted fan unit 420b, while their tilt angles are nominally set at 90 degrees. Yaw in one direction is generated when $T_a$ is greater than $T_b$, and vice versa.

Referring to FIG. 6, augmented pitch control of the air vehicle 100 (in addition to or instead of pitch control provided by control surfaces 543 operating as an elevator) is provided by varying the direction of the thrust vectors $V_a$, $V_b$ provided by forward ducted fan units 420a, 420b, in the same manner, i.e., by tilting the two ducted fan units 420a, 420 in the same direction about the nominal respective tilt angle 90 degree positions. Nose down pitch moment is provided when angles α and β are greater than 90 degrees, such that the respective thrust vectors $V_a$, $V_b$ have a downward component, and vice versa. The magnitude of the tilt angles α and β are the same if the thrust generated by the two forward ducted fan units 420a, 420b; alternatively, providing different magnitudes for angles α and β may be compensated by providing different magnitudes for the respective thrust vectors $V_a$, $V_b$.

Augmented pitch control of the air vehicle 100 (in addition to or instead of pitch control provided by control surfaces 543 operating as an elevator) may also be provided by actuation of the aft ducted fan unit 420c. Rotation of the fan of the aft ducted fan unit 420c in one direction produces an upward thrust and thus a nose-down pitching moment, while rotation of the fan in the opposite direction results in a nose-up pitching moment. In alternative variations of this embodiment, in which the fan of the aft ducted fan unit 420c has variable pitch blades, the blades may be selectively controlled to alternately generate thrust in mutually opposite directions, respectively.

It is clearly evident that the air vehicle 100 may be operated to augment or provide any suitable pitch, and/or yaw, and/or roll, by suitably combining the operations of the propulsion system 400 as disclosed above regarding FIGS. 4 to 6.

In augmented aerodynamic flight mode, the air vehicle 100 may also be operated to enable STOL operations, for example by supplementing lift generated by the wings during STOL take off and landing by providing lift vectors $V_a$ and $V_b$ greater than zero degrees but less than 90 degrees, to provide a suitable thrust component of the combined thrust ($T_a+T_b$) in the upward vertical direction. In addition, or alternatively, the aft ducted fan 420c may be used to provide additional thrust $T_c$. The air vehicle 100 may be operated in a similar manner to augment lift in forward flight when it is desired to operate the aircraft at low velocity that is insufficient to provide the desired aerodynamic lift.

In alternative variations of this embodiment, in which the air vehicle may lack wings for providing aerodynamic lift, the vehicle can operate in the aforesaid augmented aerodynamic flight regime, for providing full lift and control via the propulsion system.

Transition Between Aerodynamic Flight Mode and Vectored Thrust Flight Mode

The air vehicle 100 is configured for performing transition between aerodynamic flight mode and vectored thrust mode in a manner that is per se novel.

When making the transition from vectored thrust flight mode to aerodynamic flight mode, for example when wishing to provide forward (aerodynamic) flight after taking off or hovering, the tiltable ducted fan units 420a, 420b are rotated about their respective axes $X_a$, $X_b$ through tilt angles α and β, respectively, each from the nominal vertical position of zero degrees to the nominal horizontal position of 90 degrees. However, at the start of this tilting operation (or alternatively immediately before or immediately after the start), a braking procedure is implemented in which the respective rotor of motors 421 and the respective fans 426 are very quickly prevented from rotating at high speed, so that their angular momentum is brought down to zero or close thereto in a very short period of time. That is, at most the ensuing reduced angular momentum after the braking procedure is a very small proportion of the angular momentum of the respective fan and motor rotor during the vectored thrust flight mode just preceding the braking procedure—such a proportion may be 50%, preferably 40%, more preferably 30%, more preferably 20%, more preferably 10%, more preferably 5%, more preferably 1%, more preferably less than 1%. As soon as the ducted fan units 420a, 420b have been rotated to the aerodynamic flight mode positions, the respective motors 421 are immediately activated and run up to the required rpm to provide the required thrust for forward flight.

The transition from vertical thrust to horizontal thrust (also referred to herein as longitudinal thrust) for the ducted fan units 420a, 420b is initiated after the air vehicle 100 is provided with sufficient forward motion with respect to the surrounding air such as to enable the wings to generate sufficient lift to support the weight of the air vehicle. This may be accomplished, for example by providing forward motion in hover as described above with reference to FIG. 11 or FIG. 8, mutatis mutandis, and/or use may be made of suitable wind conditions when available to provide the required lift. Thus, during the transition, where very little or no thrust is being provided by the ducted fan units 420*a*, 420*b*, the air vehicle is supported by aerodynamic lift, and this can be subsequently further increased by the forward propulsion provided by ducted fan units 420*a*, 420*b* in horizontal thrust mode.

When making the transition from aerodynamic flight mode to vectored thrust flight mode, for example when wishing to land or hover after being in forward (aerodynamic) flight, the tiltable ducted fan units 420*a*, 420*b* are rotated about their respective axes $X_a$, $X_b$ in the reverse direction, through tilt angles α and β, each from nominally 90 degrees to nominally zero degrees, and during this transition the motor rotors of the respective motors 421 as well as the respective fans 426 are subjected to the aforesaid braking procedure, after which the respective motors 421 are immediately activated and run up to the required speed to provide the required thrust for vectored thrust mode. The forward momentum of the air vehicle prior to the transition is sufficient to ensure that enough aerodynamic lift is generated for supporting the air vehicle during transition.

At least in this embodiment, transition between aerodynamic flight mode and vectored thrust flight mode is effected when the air vehicle has a forward velocity greater than the stall speed.

A feature of the braking procedure is that minimizes or reduces to zero the gyroscopic forces on the tiltable ducted fan units 420*a*, 420*b* during this transition relative to what the gyro forces would be if the motor rotors and fans were still spinning at or close to their original rpms, and reduces the energy required for performing the transition, as well as the elapsed time thereof. In turn, the journals 450*a*, 450*b* can be correspondingly less massive than would otherwise be the case, and the drive mechanism for tilting the ducted fan units 420*a*, 420*b* can be less powerful, and typically smaller and lighter, than would otherwise be the case.

In alternative variations of this embodiment, the ducted fan units 420*a*, 420*b* can each be rotated between the vertical thrust and horizontal thrust positions while continuously providing thrust, the respective thrust vector changing between zero and 90 degrees.

It is to be noted that the ducted fan units 420*a*, 420*b* can be rotated about any desired tilt angle α, β respectively, ranging from (and including) zero to 90 degrees, or less than zero, or beyond 90 degrees, as desired, and remain at these respective tilt angles. The aforementioned brake procedure may be implemented to stop or minimize the rotation of the motors and fans while the ducted fan units 420*a*, 420*b* are being rotated, and the motors and fans are reactivated immediately upon reaching the desired tilt angles. Alternatively and particularly when using the ducted fan units 420*a*, 420*b* for yaw/pitch/roll control, and/or where the tilt angles are relatively small, the ducted fan units 420*a*, 420*b* can each be rotated through the desired tilt angles while continuously providing thrust.

By way of non-limiting example of the embodiment of FIGS. 1-11, the wingtip-to-wingtip wingspan may be between about 1.5 and about 2.5 meters, fuselage length may be about 1 meter, overall maximum take off weight of the air vehicle may be about 8.5 Kg (which can includes a payload of about 2 Kg, for example), the motors of each propulsion unit may comprise a A40 8-Pole motor (Heli version), provided by HACKER of Germany, powered by 3 or 4 eXtreme V2 batteries provided by Thunder Power of USA, and controlled by a Phoenix HV-110 control unit, provided by Castle Creations of USA. By way of further non-limiting example, such an embodiment for the air vehicle may hover for about 12 minutes or fly for about 2 hours with fully charged batteries.

Another embodiment of the air vehicle, designated by the reference numeral 800 and illustrated in FIGS. 12(*a*) and 12(*b*), has all the elements and features of the embodiment illustrated in FIGS. 1 to 11, and is operated in a similar manner thereto, mutatis mutandis, with the following difference. The air vehicle 800 thus comprises fuselage 820, wing arrangement 830, propulsion system 840 and payload 860, substantially similar to fuselage 200, wing arrangement 300, propulsion system 400 and payload 600, respectively, as disclosed for the embodiment illustrated in FIGS. 1 to 11, and alternative variations thereof, mutatis mutandis. However, empennage 850 of the embodiment of FIGS. 12(*a*) and 12(*b*) is different from empennage 500 in that, while empennage 850 also comprises a pair of laterally spaced booms (one connected to the port wing, and one connected to the starboard wing; each boom having a forward boom portion that projects forward of the leading edge of the respective wing) and each boom projects in an aft direction from the respective wing, generally intermediate between the respective wing root and wing tip, the structure at the aft end of the booms is different. In this embodiment, a fin 854 is also anhedrally mounted to each boom at the respective boom aft end, but in converging relationship with respect to the other fin 854, so that the respective fin tip 848 is below and inboard with respect to the respective fin root 842, rather than outboard. Furthermore, a horizontal stabilizer 841 is provided joining the two fin tips 848. As with the embodiment illustrated in FIGS. 1 to 11, each fin 854 comprises a control surface at the trailing edge thereof that operates both as a rudder and as a vertical stabilizer in the aerodynamic flight regime of the air vehicle, though in alternative variations of this embodiment the fins 854 may lack a control surface. The horizontal stabilizer 841 may be non-adjustable, or alternatively may comprise a control surface such as an elevator to augment or replace the elevator operation of the control surfaces of the fins 854.

Another embodiment of the air vehicle, designated by the reference numeral 900 and illustrated in FIGS. 13, 14 and 15, has all the elements and features of the embodiment illustrated in FIGS. 1 to 12(*b*) and may be operated in a similar manner thereto, mutatis mutandis, with the differences discussed below. The air vehicle 900 thus comprises fuselage 920, and payload 960, substantially similar to fuselage 200, and payload 600, respectively, as disclosed for the embodiment illustrated in FIGS. 1 to 11 and alternative variations thereof, mutatis mutandis, for example. The air vehicle 900 further comprises wing arrangement 930, propulsion system 940 and empennage 950 which have particular features according to another aspect of the invention which are per se novel and which may be applied, mutatis mutandis to other air vehicle configurations including the embodiments of FIGS. 1 to 12(*b*).

Figures 13, 14:
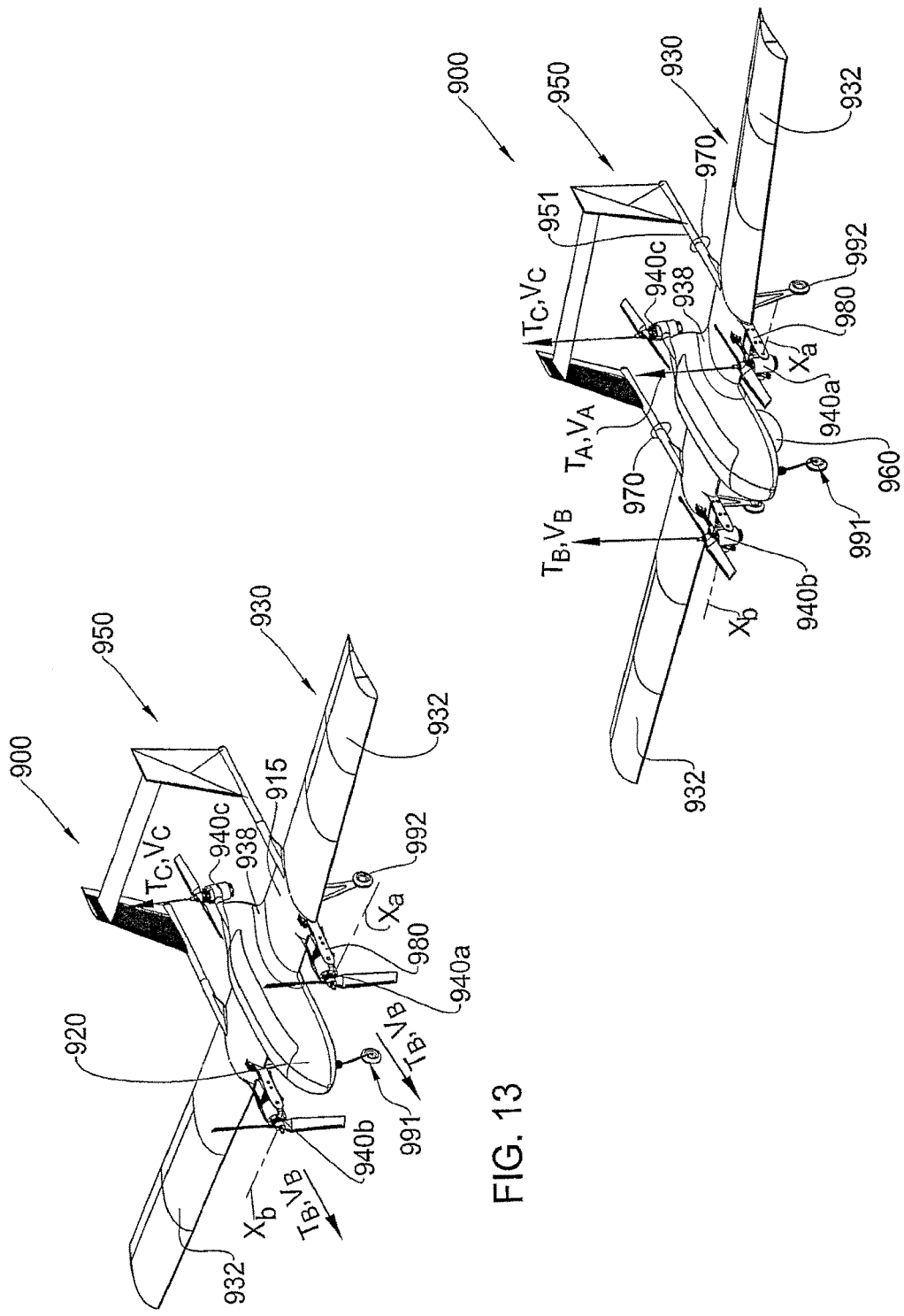
FIG. 13 is a front/top/side isometric view of another embodiment of the air vehicle of the invention in aerodynamic flight mode.
FIG. 14 is a front/top/side isometric view of the embodiment of FIG. 13, in vectored thrust flight mode.

The wing arrangement 930 of the embodiment of FIGS. 13 to 15 is similar to wing arrangement 300 of the embodiment illustrated in FIGS. 1 to 11, mutatis mutandis, and comprises a pair of wings 932. Referring particularly to FIG. 15, each wing 932 according to this aspect of the invention is modular and comprises an outboard portion 933 and an inboard portion 931. Inboard portion 931 is fixedly mounted to the fuselage 920 at the wing root 938, and is configured for enabling the respective main wheels 992 of the undercarriage 991 to be mounted thereto via mounting arrangement 993. The inboard portion 931 also comprises a support structure 970 for adjustably mounting thereto the empennage 950, and an engine mounting 980, as will be disclosed in greater detail below.

Outboard portion 933 comprises wing tip 939 and is configured for being reversibly mounted to the inboard portion 931 via mounting arrangement 910, comprising a mounting strut 912 that is receivable and reversibly engageable with respect to a load-bearing beam 914 that is comprised in the inboard portion 931. When mounted together, the inboard portion 931 and the outward portion 933 are effectively joined at a mating station 915, via mating faces 915a, 915b respectively provided on the inboard portion 931 and the outward portion 933, such as to provide aerodynamic continuity between the outer skins of the inboard portion 931 and the outward portion 933. In this embodiment, mounting arrangement 910 is configured for facilitating selective mounting and dismounting of the outward portion 933 with respect to the inboard portion 931, in particular via a ground crew, without the necessity to disassemble the outer skins of one or both portions, or without the need to return the air vehicle to the factory. Thus, outboard portion 933 is modular, and is thus easily replaceable with another outboard portion when needed or desired, for example when the original outboard portion is damaged.

Figure 16:
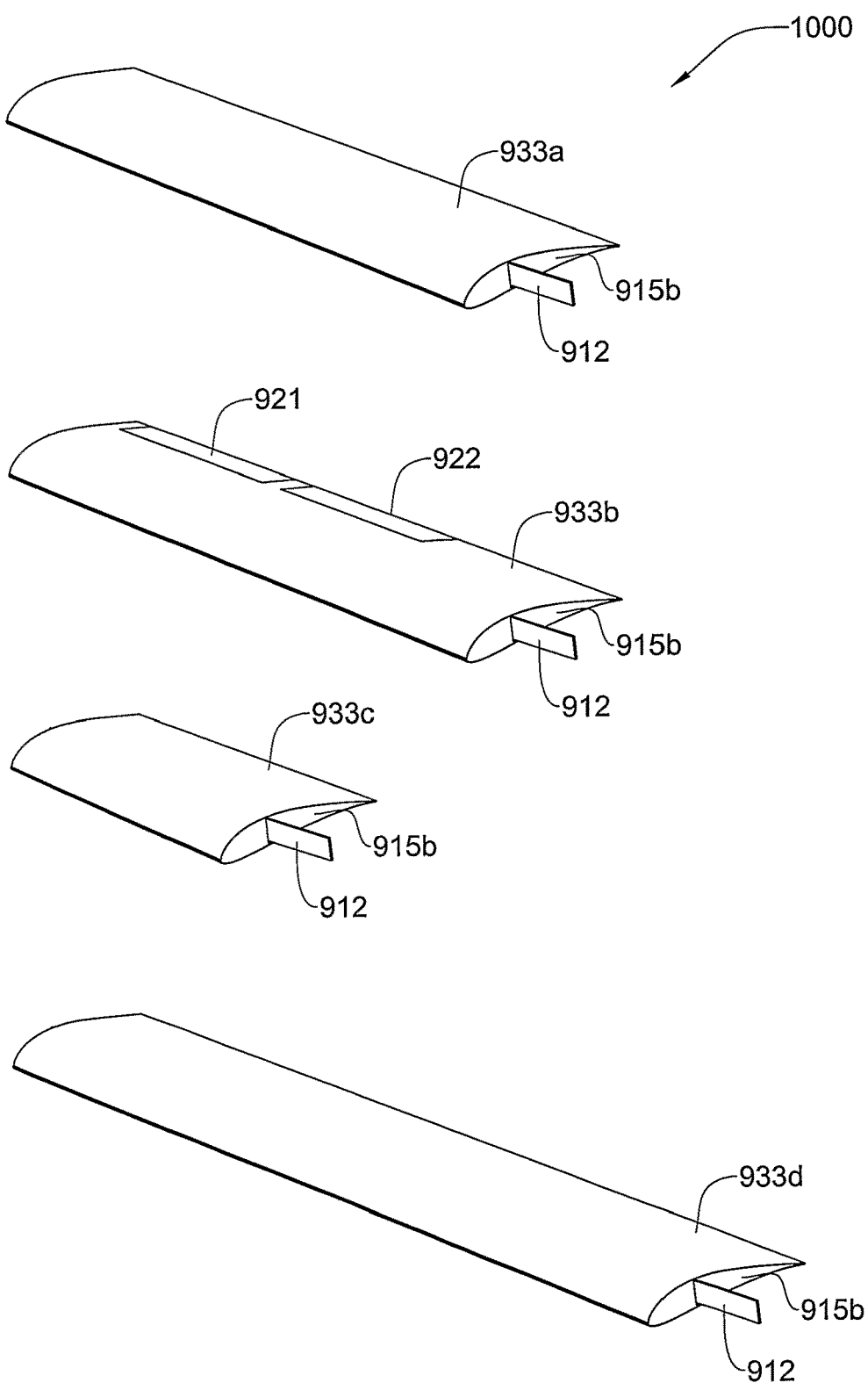
FIG. 16 illustrates a set of modular wing portions for use with the embodiment of FIG. 13.

According to this aspect of the invention, however, the modularity of the wing arrangement 930 also allows the wing configuration to be changed as desired, for example to be optimized to fit a particular mission profile. For example, and referring to FIG. 16, a set 1000 of outer portions 933a, 933b, 933, 933d may be provided, each having substantially identical mounting strut 912 and mating face 915b for enabling the respective outboard portion 933 to be in turn selectively engaged to or disengaged from the inboard portion 931. Outer portion 933b is substantially identical to outboard portion 933 of FIGS. 13 to 15, and comprises control surfaces such as aileron 921 and flaps 922. Outer portion 933a is substantially similar to outboard portion 933b, but lacks the control surfaces. Outer portion 933c is substantially similar to outboard portion 933a, but has a shorter span with respect thereto, while outer portion 933d is substantially similar to outboard portion 933a, but has a longer span with respect thereto. Set 1000 may comprise any number of suitable wing configurations.

The modularity of the wings 930 may be further extended to include the inner portions 931 in a similar manner thereto, mutatis mutandis, and a set of such inner portions may also be provided to enable the relative lateral spacing between the tiltable propulsion units 940a 940b (see below) to be changed, for example.

The modularity of the wings 930 also allow the air vehicle 900 to operated without any wings, in vectored thrust flight mode only.

Figure 12A:
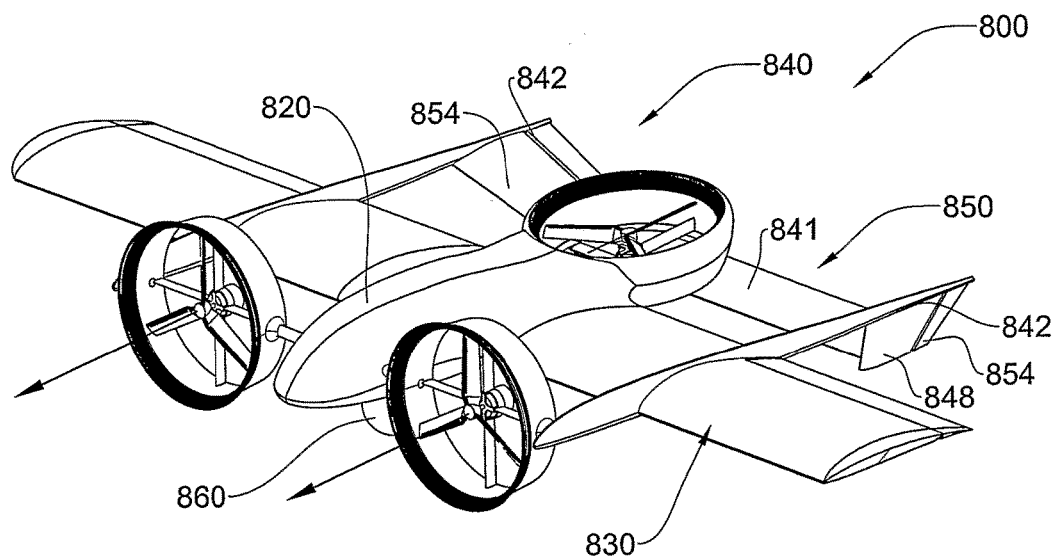
FIG. 12(a) and FIG. 12 (b) are front/top/side isometric views of another embodiment of the air vehicle of the invention in aerodynamic flight mode and in vectored thrust flight mode, respectively.
Figure 12B:
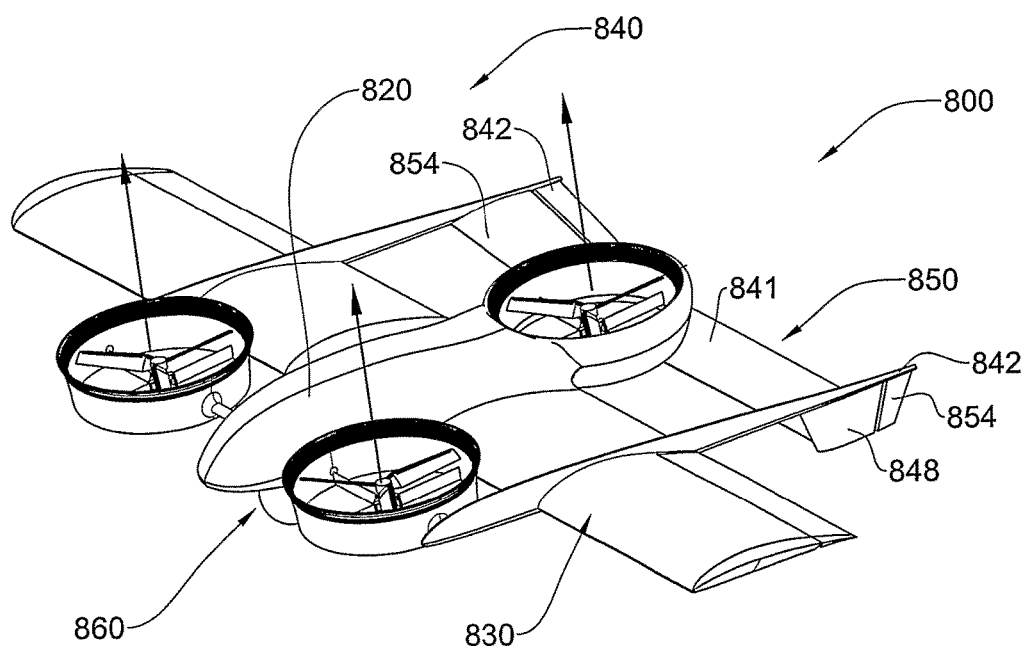

The empennage 950 of this embodiment is similar to empennage 850 of the embodiment of FIGS. 12(a), 12(b), mutatis mutandis, and comprises a pair of laterally spaced booms 951, and each boom projects in an aft direction from the respective wing, generally intermediate between the respective wing root and wing tip. In this embodiment, each boom is connected to the respective inboard portion 931 via said support structure 970. Fins 954 are mounted to each boom 951 at the respective boom aft end, but in upwardly projecting and mutually converging relationship, so that the respective fin tips 948 are each above and inboard with respect to the respective fin roots 942, and a horizontal stabilizer 941 is provided joining the two fin tips 948. The horizontal stabilizer 941 comprises a control surface 949 such as an elevator, though in alternative variations of this embodiment, the horizontal stabilizer 941 may instead be non-adjustable. In this embodiment the fins 954 do not comprise controllable control surfaces, but in alternative variations of the embodiment, each fin may comprise a control surface at the trailing edge thereof that operates as a rudder and/or as a vertical stabilizer in the aerodynamic flight regime of the air vehicle 900.

Referring to FIGS. 15 and 15a, support structure 970 comprises a tubular load-carrying member 972 fixedly mounted to the trailing edge of the respective inboard portion 931, and a mating end 971 of the respective boom 951 that is configured for telescopically engaging with the member 972. Mating end 971 is of an axial length that enables the end 971 to be inserted into the respective member 972 to a selectively variable depth, thereby enabling the longitudinal position of the empennage, in particular the fins 954 and stabilizer 941, to be varied with respect to the position of the wings, and thus of the fuselage. Suitable fixing means are provided to selectively fix the relative position between the end 971 and the member 972 at a particular position. For example, and referring to FIG. 15a in particular, the end 971 may comprise a series of holes therethrough and in spaced arrangement along a longitudinal line, and one such hole may be aligned at a time with a corresponding hole in the member 972, and the end 971 and the member 972 secured together via for example bolts passing through the aligned holes. Such an arrangement allows the spacing of the empennage to be changed with respect to the fuselage in a stepwise manner. Alternatively, the spacing between the empennage and the fuselage or wings may be changed in a continuous manner by using a suitable clamping arrangement that clamps the end 971 to the member 972 at any desired relative position. Many other arrangements for selectively fixing the end 971 to the member 972 will be apparent to the skilled practitioner in view of the present disclosure. These examples for support structure 970 thus allow the relative spacing between the empennage and the fuselage to be changed by a ground crew, for example. Alternatively, a set of empennages may be provided, wherein such empennages each has longitudinal length different from one another, so that the original empennage may be replaced on the air vehicle with a different-sized empennage to effectively change the relative spacing between the empennage and the fuselage.

In alternative variations of this embodiment, the support structure 970 may be configured for changing the relative spacing between the empennage and the fuselage in an automated manner, for example by providing a suitable actuator, such as for example a hydraulic jack, pneumatic jack, mechanical jack, electrical jack and so on, to selectively and reciprocably move the end 971 with respect to member 972. In such embodiments, the change in the relative spacing between the empennage and the fuselage may also be carried out during aerodynamic flight of the air vehicle 900, as well as on the ground or during hover.

It is to be noted that changing the relative spacing between the empennage and the fuselage enables the center of gravity of the air vehicle 900 to be changed. A feature of this is that payloads of widely varying weight may be carried by the air vehicle at the same position on the fuselage and/or wings, and the potential change in position of the center of gravity may be compensated by changing the relative spacing between the empennage and the fuselage, which thereby minimizes or eliminates the need to trim the air vehicle in a manner that would otherwise increases drag, and/or the need to change the thrust ratio generated by propulsion units of the propulsion system.

It is to be noted that changing the relative spacing between the empennage and the fuselage also enables the aerodynamic center of the air vehicle 900 to be selectively changed. Thus, for example, if the wings of the air vehicle are replaced with shorter or longer wings, respectively configured for providing less or more lift, the empennage may be spaced closer to or further away, respectively, to the wings, to compensate the change in lift by correspondingly varying the moment arm of the empennage. Such changes in wing lift may be provided, for example, by means of the modular wing feature of this embodiment.

The propulsion system 940 of this embodiment is similar to the propulsion system of the embodiment illustrated in FIGS. 1 to 11, mutatis mutandis, and comprises two tiltable propulsion units 940a, 940b and a fixed propulsion unit 940c. In this embodiment, the three propulsion units are propeller units, directly driven by the respective driveshaft of the respective motor 994, though in alternative variations of this embodiment, one or more of the propulsion units 940 may be of a different configuration, for example as disclosed for the embodiment illustrated in FIGS. 1 to 11 and alternative variations thereof, mutatis mutandis. In the illustrated embodiment, the tiltable propulsion units 940a, 940b are pivotably mounted to the respective inboard portion 931 of the respective wing, in particular to the respective forwardly projecting engine mounting 980, though in alternative variations of this embodiment, the tiltable propulsion units 940a, 940b may be pivotably mounted to the wings and/or fuselage in any suitable manner. In any case, the tiltable propulsion units 940a, 940b are pivotable about pivot axes Xa, Xb, respectively, in a similar manner to that of the embodiment illustrated in FIGS. 1 to 11, mutatis mutandis, allowing the thrust vectors Va, Vb and the thrusts Ta, Tb, respectively, generated by the tiltable propulsion units 940a, 940b to be selectively varied, independently of one another, in a similar manner to that of the embodiment illustrated in FIGS. 1 to 11, mutatis mutandis.

Propulsion unit 940c provides thrust Tc having a nominally vertical thrust vector Vc, and is mounted to the aft end of fuselage 920 via support structure 949, which is configured for enabling the longitudinal spacing between the propulsion unit 940c and the fuselage to be selectively varied, manually or in an automated manner, for example in a similar manner to that of the support structure 970, mutatis mutandis. Thus, for example, support structure 949 comprises a tubular member 943 fixed to the aft end of the fuselage, and the propulsion unit 940c comprises a longitudinal strut having an end 944 that is telescopically received in and reversibly engages with member 943 at any number of desired longitudinal positions (or alternatively a plurality of different-sized struts for the propulsion unit 940c may be provided), for example as disclosed for the support structure 970, mutatis mutandis. This feature can be also used to adjust the position of the center of gravity of the air vehicle 900, together with, or instead of, the feature of the movable empennage, as discussed above.

Optionally, the propulsion unit 940c may be removed altogether from the air vehicle 900, enabling the air vehicle 900 to operate as a STOL vehicle or as a conventional air vehicle, rendering the air vehicle 900 even more flexible and mission adaptive. Thus, during maintenance of the aft propulsion unit 940c, or where full VTOL capability is not required, the air vehicle 900 can still be operated by removing the propulsion unit 940c.

In these or other alternative variations of the illustrated embodiments, the propulsion system may comprise more than three propulsion units in any suitable configuration, wherein at least two such propulsion units provide a controllable thrust vector and have adjustable thrust levels, which are selectively and independently controllable for each of these propulsion units separately, and operate in a similar manner to the two forward mounted ducted fan units of the illustrated embodiments, mutatis mutandis. For example, the propulsion system may comprise 4, 5, 6 or more propulsion units.

In these or other alternative variations of the illustrated embodiments, the propulsion system may comprise a plurality of propulsion units that are different from ducted fan units, mutatis mutandis, comprising, for example, turboprop units, turbofan units, turbojet units, propfan (unducted fan) units, propellers (shrouded or enshrouded), and so on, or any combination thereof and/or of ducted fan units. In each case, at least two of the propulsion systems are independently controllable one from another to provide a desired thrust vector and/or a desired thrust level.

In these or other alternative variations of the illustrated embodiments, the propulsion system may comprise a plurality of propulsion units, in which each propulsion unit may comprise a cluster of thrust-producing motors, for example a cluster of ducted fans.

In these or other alternative variations of the illustrated embodiments, the propulsion system may comprise a plurality of electrically powered propulsion units, in which power to these propulsion units is provided from a ground power generating unit via a tether that includes at least one electrical cable. The ground unit may be static, which allows the air vehicle to be in hover or forward flight within a circuit determined by the length and flexibility of the tether. Alternatively, the ground unit may be carried on a ground vehicle, and thus allows the air vehicle to be in hover or forward flight by remaining close to the ground vehicle which is also moving.

In alternative variations of the illustrated embodiments, the air vehicle may be provided without wings or empennage, and is otherwise similar to and thus operates in a similar manner to the illustrated embodiments, mutatis mutandis, but in vectored thrust flight mode only.

In alternative variations of the illustrated embodiments, the air vehicle may be provided without a fuselage per se and optionally without empennage, and is otherwise similar to and thus operates in a similar manner to the illustrated embodiments, mutatis mutandis, the air vehicle being of a flying wing type of vehicle wherein the air vehicle body constitutes the wings rather than a fuselage. In such applications or the invention, the propulsion units are mounted to the air vehicle body.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

The invention claimed is:

1. An air vehicle comprising a center of gravity and a propulsion and control system, the propulsion and control system comprising a plurality of propulsion units, the plurality of propulsion units consisting of three propulsion units in triangular spatial arrangement in plan view, and configured for enclosing the center of gravity of the air vehicle within the triangular spatial arrangement, wherein:
- a first propulsion unit of the plurality of propulsion units is a tiltable propulsion unit;
- a second propulsion unit of the plurality of propulsion units is a tiltable propulsion unit; and
- a third propulsion unit of the plurality of propulsion units is a non-tiltable propulsion unit configured for being fixedly mounted to the air vehicle; wherein
  - the propulsion and control system is configured such that the first propulsion unit and the second propulsion unit are laterally spaced from a longitudinal axis of the air vehicle,
  - each of the first propulsion unit and the second propulsion unit are configured to generate a respective thrust, and are selectively tiltable about a first tilt axis and a second axis, respectively, between a vertical position that is perpendicular to the longitudinal axis of the air vehicle and a horizontal position to provide a respective thrust vector that is selectively variable at least between a general vertical thrust vector direction and a general longitudinal thrust vector direction with respect to the air vehicle;
  - the first propulsion unit comprises a first integrated motor arrangement that provides motive power to the first propulsion unit, and the first propulsion unit and the first integrated motor arrangement tilt together as a single integrated unit about the first tilt axis between the respective vertical position and the respective horizontal position;
  - the second propulsion unit comprises a second integrated motor arrangement that provides motive power to the second propulsion unit, and the second propulsion unit and the second integrated motor arrangement tilt together as a single integrated unit about a second tilt axis between the respective vertical position and the respective horizontal position;
  - the third propulsion unit is configured to generate a respective thrust having a thrust vector fixed with respect to the air vehicle and alignable in at least the general vertical thrust vector direction;
  - the propulsion and control system is configured to:
    - (i) selectively enable the first propulsion unit, the second propulsion unit, and the third propulsion unit to provide sufficient thrust to the air vehicle for vectored thrust flight when the respective thrust vectors the first propulsion unit, the second propulsion unit and the third propulsion unit are aligned with the general vertical thrust vector direction, and
    - (ii) selectively enable the first propulsion unit and the second propulsion unit to provide sufficient thrust to the air vehicle for aerodynamic flight when the respective variable thrust vectors of the first propulsion unit, the second propulsion unit are aligned with the general longitudinal thrust vector direction; and
  - the propulsion and control system is further configured to selectively generate variable control moments for control and stability of the air vehicle including:
    - (a) controllably varying the respective thrust generated by each of the first propulsion unit, the second propulsion unit, and the third propulsion unit independently of one another; and
    - (b) controllably varying the respective variable thrust vector provided by each of the first propulsion unit and the second propulsion unit independently of one another by at least including tilting the first propulsion unit about the first tilt axis in a first tilt direction and concurrently tilting the second propulsion unit about the second tilt axis in a second tilt direction, the first tilt direction being opposite to the second tilt direction;
  - said air vehicle further comprising a fuselage and wings fixedly connected to the fuselage in fixed geometrical relationship;
  - wherein said first and second propulsion units are mounted forward of said wings, and wherein said third propulsion is mounted aft of said wings, wherein said wings are configured for providing aerodynamic lift of the air vehicle in said aerodynamic flight.

2. The air vehicle according to claim 1, wherein each of the first propulsion unit and the second propulsion unit comprises any one of a tiltable propeller unit, a tiltable turbojet unit, a tiltable turbofan unit, and a tiltable propfan unit.

3. The air vehicle according to claim 1, wherein the third propulsion unit is a tiltable propulsion unit that is tiltable about at least one respective tilt axis.

4. The air vehicle according to claim 3, wherein the third propulsion unit is configured to provide a respective variable thrust vector that is selectively variable at least between the general vertical thrust vector direction and the general longitudinal thrust vector direction.

5. The air vehicle according to claim 1, wherein the system is further configured to provide at least one of:
- the variable control moment in the form of a pitch control moment in the vectored thrust flight by varying a ratio of the respective thrusts generated by the first propulsion unit and the second propulsion unit with respect to the respective thrust generated by the third propulsion unit;
- the variable control moment in the form of a yaw control moment in the vectored thrust flight by suitably varying the respective thrust vectors of the tiltable propulsion units responsive to tilting the first propulsion unit and the second propulsion unit in mutually opposite directions with respect to the respective tilt axes; and
- the variable control moment in the form of a roll control moment in the vectored thrust flight by varying a ratio of the respective thrust generated by the first propulsion unit with respect to the respective thrust generated by the second propulsion unit.

6. The air vehicle according to claim 1, wherein the system is further configured to provide at least one of:
- the variable control moment in the form of a yaw control moment in the aerodynamic flight by varying a ratio of the thrust generated by the first propulsion unit with respect to the thrust generated by the second propulsion unit;
- the variable control moment in the form of a roll control moment in the aerodynamic flight by suitably varying the respective thrust vectors of the first propulsion unit and the second propulsion unit responsive to tilting the first propulsion unit and the second propulsion unit in mutually opposite directions with respect to the respective tilt axes; and
- the variable control moment in the form of a pitch control moment in the aerodynamic flight by suitably varying the respective thrust vectors of the first propulsion unit and the second propulsion unit responsive to tilting the first propulsion unit and the second propulsion unit in mutually similar directions.

7. The air vehicle according to claim 1, wherein each of the first propulsion unit and the second propulsion unit has a rotary component whereby rotation of the rotary component is configured to generate a thrust for operation of the propulsion unit.

8. The air vehicle according to claim 7, wherein each of the first propulsion unit and the second propulsion unit is configured to induce a braking procedure for the integrated motor while each of the first propulsion unit and the second propulsion unit is being tilted through a desired tilt angle to vary the respective thrust vector thereof, comprising a braking arrangement that is configured to stop or significantly reduce rotation of the rotary component during at least a major portion of the tilting of the first propulsion unit and the second propulsion unit between the general vertical thrust vector direction and the general longitudinal thrust vector direction.

9. The air vehicle according to claim 1, wherein the first propulsion unit and the second propulsion unit are configured as mutually co-rotating propulsion units.

10. The air vehicle according to claim 1, wherein the air vehicle is configured to cruise.

11. The air vehicle according to claim 10, wherein
the first propulsion unit and the second propulsion unit are mounted to the air vehicle forward of the center of gravity of the air vehicle; and
the third propulsion unit is mounted aft of the center of gravity.

12. The air vehicle according to claim 10, wherein
the air vehicle comprises an empennage; and
the wings and the empennage are configured to provide aerodynamic lift and stability of the air vehicle in the aerodynamic flight.

13. The air vehicle according to claim 12, wherein at least one of the wings and the empennage is further configured to generate variable aerodynamic control moments for control of the air vehicle in the aerodynamic flight operations.

14. The air vehicle according to claim 12, wherein
the wings are modular and selectable from a group of modular wing sets; and
each of the modular wing sets is configured to be mountable in turn to the body to provide aerodynamic lift in forward flight.

15. The air vehicle according to claim 10, wherein the propulsion and control system is further configured to selectively change the position of the center of gravity.

16. A method for operating an air vehicle, the method comprising:
(a) providing an air vehicle as defined in claim 1;
(b) operating the first propulsion unit and the second propulsion unit to generate sufficient longitudinal thrust for enabling aerodynamic flight operations; and
(c) augmenting the aerodynamic control moments by operating the propulsion system that generates the variable control moments.

17. The air vehicle according to claim 1, wherein the respective tilt axis is parallel to a pitch axis.

18. A method for operating an air vehicle having a center of gravity and a propulsion and control system, the method comprising:
(A) providing the air vehicle, wherein the propulsion and control system comprises a plurality of propulsion units, the plurality of propulsion units consisting of three propulsion units in triangular spatial arrangement in plan view and configured for enclosing the center of gravity of the air vehicle within the triangular spatial arrangement, wherein:

a first propulsion unit of the plurality of propulsion units is a tiltable propulsion unit;
a second propulsion unit of the plurality of propulsion units is a tiltable propulsion unit; and
a third propulsion unit of the plurality of propulsion units is a non-tiltable propulsion unit configured for being fixedly mounted to the air vehicle;
the propulsion and control system are configured such that the first propulsion unit and the second propulsion unit are laterally spaced from a longitudinal axis of the air vehicle,
each of the first propulsion unit and the second propulsion unit are configured to generate a respective thrust, and are selectively tiltable about a first tilt axis and a second tilt axis, respectively, between a vertical position that is perpendicular to the longitudinal axis of the air vehicle and a horizontal position to provide a respective thrust vector that is selectively variable at least between a general vertical thrust vector direction and a general longitudinal thrust vector direction with respect to the air vehicle;
the first propulsion unit comprises a first integrated motor arrangement that provides motive power to the first propulsion unit, and the first propulsion unit and the first integrated motor arrangement tilt together as a single integrated unit about the first tilt axis between the respective vertical position and the respective horizontal position;
the second propulsion unit comprises a second integrated motor arrangement that provides motive power to the second propulsion unit, and wherein the second propulsion unit and the second integrated motor arrangement tilt together as a single integrated unit about the second tilt axis between the respective vertical position and the respective horizontal position;
the third propulsion unit is configured to generate a respective thrust having a thrust vector fixed with respect to the air vehicle and alignable in at least the general vertical thrust vector direction;
the air vehicle further comprising a fuselage and wings fixedly connected to the fuselage in fixed geometrical relationship;
wherein said first and second propulsion units are mounted forward of said wings, and wherein said third propulsion is mounted aft of said wings, wherein said wings are configured for providing aerodynamic lift of the air vehicle in said aerodynamic flight;
(B) selectively operating the three propulsion units to provide sufficient thrust to the air vehicle for:
(i) vectored thrust flight, wherein the respective thrust vectors of the first propulsion unit, the second propulsion unit and the third propulsion unit are aligned with the generally vertical thrust vector direction; and
(ii) aerodynamic flight, wherein the respective variable thrust vectors of the first propulsion unit and the second propulsion unit are aligned with the generally longitudinal thrust vector direction; and
(C) selectively generating variable control moments for control and stability of the air vehicle, including:
(a) controllably varying the respective thrust generated by each of the three propulsion units independently of one another; and
(b) controllably varying the respective variable thrust vector provided by each of the tiltable propulsion units independently of one another by at least including tilting one of the first propulsion unit and the second propulsion unit about the respective first or second tilt axis in a first tilt direction, and concurrently tilting the other one of the first propulsion unit and the second propulsion unit units about the respective first or second tilt axis in a second tilt direction, the first tilt direction being opposite to the second tilt direction.

19. An air vehicle comprising a center of gravity and a propulsion and control system, the propulsion and control system comprising a plurality of propulsion units, the plurality of propulsion units consisting of three propulsion units in triangular spatial arrangement in plan view, and configured for enclosing the center of gravity of the air vehicle within the triangular spatial arrangement, wherein:
- a first propulsion unit of the plurality of propulsion units is a tiltable propulsion unit;
- a second propulsion unit of the plurality of propulsion units is a tiltable propulsion unit; and
- a third propulsion unit of the plurality of propulsion units is a non-tiltable propulsion unit configured for being fixedly mounted to the air vehicle; wherein
  - the propulsion and control system is configured such that the first propulsion unit and the second propulsion unit are laterally spaced from a longitudinal axis of the air vehicle,
  - each of the first propulsion unit and the second propulsion unit are configured to generate a respective thrust, and are selectively tiltable about a first tilt axis and a second axis, respectively, between a vertical position that is perpendicular to the longitudinal axis of the air vehicle and a horizontal position to provide a respective thrust vector that is selectively variable at least between a general vertical thrust vector direction and a general longitudinal thrust vector direction with respect to the air vehicle;
  - the first propulsion unit comprises a first integrated motor arrangement that provides motive power to the first propulsion unit, and the first propulsion unit and the first integrated motor arrangement tilt together as a single integrated unit about the first tilt axis between the respective vertical position and the respective horizontal position;
  - the second propulsion unit comprises a second integrated motor arrangement that provides motive power to the second propulsion unit, and the second propulsion unit and the second integrated motor arrangement tilt together as a single integrated unit about a second tilt axis between the respective vertical position and the respective horizontal position;
  - the third propulsion unit is configured to generate a respective thrust having a thrust vector fixed with respect to the air vehicle and alignable in at least the general vertical thrust vector direction;
  - the propulsion and control system is configured to:
    (i) selectively enable the first propulsion unit, the second propulsion unit, and the third propulsion unit to provide sufficient thrust to the air vehicle for vectored thrust flight when the respective thrust vectors the first propulsion unit, the second propulsion unit and the third propulsion unit are aligned with the general vertical thrust vector direction, and
    (ii) selectively enable the first propulsion unit and the second propulsion unit to provide sufficient thrust to the air vehicle for aerodynamic flight when the respective variable thrust vectors of the first propulsion unit, the second propulsion unit are aligned with the general longitudinal thrust vector direction; and
  - the propulsion and control system is further configured to selectively generate variable control moments for control and stability of the air vehicle including:
    (a) controllably varying the respective thrust generated by each of the first propulsion unit, the second propulsion unit, and the third propulsion unit independently of one another; and
    (b) controllably varying the respective variable thrust vector provided by each of the first propulsion unit and the second propulsion unit independently of one another by at least including tilting the first propulsion unit about the first tilt axis in a first tilt direction and concurrently tilting the second propulsion unit about the second tilt axis in a second tilt direction, the first tilt direction being opposite to the second tilt direction; said air vehicle comprising a fuselage and wings fixedly connected to the fuselage in fixed geometrical relationship;

wherein said first and second propulsion units are mounted aft of said wings, and wherein said third propulsion unit is mounted forward of said wings, wherein said wings are configured for providing aerodynamic lift of the air vehicle in said aerodynamic flight.

* * * * *